(12) United States Patent
Svendsen et al.

(10) Patent No.: US 8,874,655 B2
(45) Date of Patent: Oct. 28, 2014

(54) MATCHING PARTICIPANTS IN A P2P RECOMMENDATION NETWORK LOOSELY COUPLED TO A SUBSCRIPTION SERVICE

(75) Inventors: Hugh Svendsen, Chapel Hill, NC (US); Michael T. Hoffman, Carrboro, NC (US)

(73) Assignee: Napo Enterprises, LLC, Wilmington, DE (US)

( * ) Notice: Subject to any disclaimer, the term of this patent is extended or adjusted under 35 U.S.C. 154(b) by 2100 days.

(21) Appl. No.: 11/609,962

(22) Filed: Dec. 13, 2006

(65) Prior Publication Data

US 2009/0083117 A1    Mar. 26, 2009

(51) Int. Cl.
*G06F 15/16* (2006.01)
*G06F 15/167* (2006.01)
*G06F 12/00* (2006.01)
*G06F 17/30* (2006.01)

(52) U.S. Cl.
CPC .... *G06F 17/30758* (2013.01); *G06F 17/30209* (2013.01); *G06F 17/30749* (2013.01); *G06F 17/30743* (2013.01); *G06F 17/30766* (2013.01)
USPC ............................ 709/205; 709/219; 707/899

(58) Field of Classification Search
CPC .................................................... G06Q 10/10
USPC ................................. 709/200–250; 707/104.1
See application file for complete search history.

(56) References Cited

U.S. PATENT DOCUMENTS

| | | |
|---|---|---|
| 4,870,579 A | 9/1989 | Hey |
| 5,621,456 A | 4/1997 | Florin et al. |
| 5,963,916 A | 10/1999 | Kaplan |
| 6,195,657 B1 | 2/2001 | Rucker et al. |
| 6,266,649 B1 | 7/2001 | Linden et al. |
| 6,317,722 B1 | 11/2001 | Jacobi et al. |
| 6,353,823 B1 | 3/2002 | Kumar |
| 6,388,714 B1 | 5/2002 | Schein et al. |
| 6,438,579 B1 | 8/2002 | Hosken |
| 6,526,411 B1 | 2/2003 | Ward |

(Continued)

FOREIGN PATENT DOCUMENTS

| | | |
|---|---|---|
| EP | 1536352 A1 | 6/2005 |
| GB | 2372850 A | 9/2002 |

(Continued)

OTHER PUBLICATIONS

"Ringo: Social Information Filtering for Music Recommendation," http://jolomo.net/ringo.html, printed Aug. 3, 2009, 1 page.

(Continued)

*Primary Examiner* — Ian N Moore
*Assistant Examiner* — Kiet Tang

(57) ABSTRACT

A system and method are provided for matching participants in a Peer-to-Peer (P2P) recommendation network that is loosely coupled to a subscription music service. In general, the system includes a central server and a number of peer devices. For each of the peer devices, an associated user is either a subscriber to the subscription music service or a non-subscriber. When a user of a peer device desires to identify new friends with which to exchange recommendations in the P2P recommendation network, a friend recommendation function of the central server identifies new friends for the user of the peer device based on the user's status as either a subscriber or a non-subscriber to the subscription music service.

26 Claims, 12 Drawing Sheets

(56) References Cited

U.S. PATENT DOCUMENTS

| | | |
|---|---|---|
| 6,567,797 B1 | 5/2003 | Schuetze et al. |
| 6,615,208 B1 | 9/2003 | Behrens et al. |
| 6,629,104 B1 | 9/2003 | Parulski et al. |
| 6,636,836 B1 | 10/2003 | Pyo |
| 6,662,231 B1 | 12/2003 | Drosset et al. |
| 6,670,537 B2 | 12/2003 | Hughes et al. |
| 6,694,482 B1 | 2/2004 | Arellano et al. |
| 6,757,517 B2 | 6/2004 | Chang |
| 6,757,691 B1 | 6/2004 | Welsh et al. |
| 6,801,909 B2 | 10/2004 | Delgado et al. |
| 6,865,565 B2 | 3/2005 | Rainsberger et al. |
| 6,904,264 B1 | 6/2005 | Frantz |
| 6,941,275 B1 | 9/2005 | Swierczek |
| 6,941,324 B2 | 9/2005 | Plastina et al. |
| 6,947,922 B1 | 9/2005 | Glance |
| 6,976,228 B2 | 12/2005 | Bernhardson |
| 6,990,453 B2 | 1/2006 | Wang et al. |
| 7,013,301 B2 | 3/2006 | Holm et al. |
| 7,072,846 B1 | 7/2006 | Robinson |
| 7,072,886 B2 | 7/2006 | Salmenkaita et al. |
| 7,075,000 B2 | 7/2006 | Gang et al. |
| 7,089,248 B1 | 8/2006 | King et al. |
| 7,096,234 B2 | 8/2006 | Plastina et al. |
| 7,120,619 B2 | 10/2006 | Drucker et al. |
| 7,139,757 B1 | 11/2006 | Apollonsky et al. |
| 7,177,872 B2 | 2/2007 | Schwesig et al. |
| 7,222,187 B2 | 5/2007 | Yeager et al. |
| 7,283,992 B2 | 10/2007 | Liu et al. |
| 7,496,623 B2 | 2/2009 | Szeto et al. |
| 7,594,246 B1 | 9/2009 | Billmaier et al. |
| 2001/0013009 A1 | 8/2001 | Greening et al. |
| 2001/0021914 A1 | 9/2001 | Jacobi et al. |
| 2002/0052207 A1 | 5/2002 | Hunzinger |
| 2002/0052873 A1 | 5/2002 | Delgado et al. |
| 2002/0082901 A1 | 6/2002 | Dunning et al. |
| 2002/0087382 A1 | 7/2002 | Tiburcio |
| 2002/0103796 A1 | 8/2002 | Hartley |
| 2002/0116533 A1 | 8/2002 | Holliman et al. |
| 2002/0138836 A1 | 9/2002 | Zimmerman |
| 2002/0165793 A1 | 11/2002 | Brand et al. |
| 2002/0178057 A1 | 11/2002 | Bertram et al. |
| 2003/0001907 A1 | 1/2003 | Bergsten et al. |
| 2003/0014407 A1 | 1/2003 | Blatter et al. |
| 2003/0046399 A1 | 3/2003 | Boulter et al. |
| 2003/0055516 A1 | 3/2003 | Gang et al. |
| 2003/0055657 A1 | 3/2003 | Yoshida et al. |
| 2003/0089218 A1 | 5/2003 | Gang et al. |
| 2003/0115167 A1 | 6/2003 | Sharif et al. |
| 2003/0135513 A1 | 7/2003 | Quinn et al. |
| 2003/0149612 A1 | 8/2003 | Berghofer et al. |
| 2003/0160770 A1 | 8/2003 | Zimmerman |
| 2003/0191753 A1 | 10/2003 | Hoch |
| 2003/0229537 A1 | 12/2003 | Dunning et al. |
| 2003/0237093 A1 | 12/2003 | Marsh |
| 2004/0003392 A1 | 1/2004 | Trajkovic et al. |
| 2004/0034441 A1 | 2/2004 | Eaton et al. |
| 2004/0091235 A1 | 5/2004 | Gutta |
| 2004/0107821 A1 | 6/2004 | Alcalde et al. |
| 2004/0128286 A1 | 7/2004 | Yasushi et al. |
| 2004/0162830 A1 | 8/2004 | Shirwadkar et al. |
| 2004/0181540 A1 | 9/2004 | Jung et al. |
| 2004/0186733 A1 | 9/2004 | Loomis et al. |
| 2004/0199527 A1 | 10/2004 | Morain et al. |
| 2004/0216108 A1 | 10/2004 | Robbin |
| 2004/0224638 A1 | 11/2004 | Fadell et al. |
| 2004/0252604 A1 | 12/2004 | Johnson et al. |
| 2004/0267604 A1 | 12/2004 | Gross |
| 2005/0021420 A1 | 1/2005 | Michelitsch et al. |
| 2005/0021678 A1 | 1/2005 | Simyon et al. |
| 2005/0026559 A1 | 2/2005 | Khedouri |
| 2005/0038819 A1 | 2/2005 | Hicken et al. |
| 2005/0038876 A1* | 2/2005 | Chaudhuri ............... 709/219 |
| 2005/0060264 A1 | 3/2005 | Schrock et al. |
| 2005/0060666 A1 | 3/2005 | Hoshino et al. |
| 2005/0065976 A1 | 3/2005 | Holm et al. |
| 2005/0120053 A1 | 6/2005 | Watson |
| 2005/0125222 A1 | 6/2005 | Brown et al. |
| 2005/0154764 A1 | 7/2005 | Riegler et al. |
| 2005/0154767 A1 | 7/2005 | Sako |
| 2005/0158028 A1 | 7/2005 | Koba |
| 2005/0166245 A1 | 7/2005 | Shin et al. |
| 2005/0197961 A1 | 9/2005 | Miller et al. |
| 2005/0228830 A1 | 10/2005 | Plastina et al. |
| 2005/0246391 A1 | 11/2005 | Gross |
| 2005/0251455 A1 | 11/2005 | Boesen |
| 2005/0251807 A1 | 11/2005 | Weel |
| 2005/0256756 A1 | 11/2005 | Lam et al. |
| 2005/0256866 A1 | 11/2005 | Lu et al. |
| 2005/0267944 A1 | 12/2005 | Little, II |
| 2005/0278758 A1 | 12/2005 | Bodlaender |
| 2005/0286546 A1 | 12/2005 | Bassoli et al. |
| 2006/0004640 A1 | 1/2006 | Swierczek |
| 2006/0004704 A1 | 1/2006 | Gross |
| 2006/0008256 A1 | 1/2006 | Khedouri et al. |
| 2006/0010167 A1 | 1/2006 | Grace et al. |
| 2006/0020662 A1 | 1/2006 | Robinson |
| 2006/0026048 A1 | 2/2006 | Kolawa et al. |
| 2006/0048059 A1 | 3/2006 | Etkin |
| 2006/0064716 A1 | 3/2006 | Sull et al. |
| 2006/0074750 A1 | 4/2006 | Clark et al. |
| 2006/0083119 A1 | 4/2006 | Hayes |
| 2006/0085383 A1 | 4/2006 | Mantle et al. |
| 2006/0100924 A1 | 5/2006 | Tevanian, Jr. |
| 2006/0126135 A1 | 6/2006 | Stevens et al. |
| 2006/0143236 A1* | 6/2006 | Wu ............................ 707/104.1 |
| 2006/0156242 A1 | 7/2006 | Bedingfield |
| 2006/0174277 A1 | 8/2006 | Sezan et al. |
| 2006/0195479 A1* | 8/2006 | Spiegelman et al. ...... 707/104.1 |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195521 A1 | 8/2006 | New et al. |
| 2006/0195789 A1 | 8/2006 | Rogers et al. |
| 2006/0195790 A1 | 8/2006 | Beaupre et al. |
| 2006/0200435 A1 | 9/2006 | Flinn et al. |
| 2006/0218187 A1 | 9/2006 | Plastina et al. |
| 2006/0227673 A1 | 10/2006 | Yamashita et al. |
| 2006/0253417 A1 | 11/2006 | Brownrigg et al. |
| 2006/0259355 A1 | 11/2006 | Farouki et al. |
| 2006/0265409 A1 | 11/2006 | Neumann et al. |
| 2006/0271959 A1 | 11/2006 | Jacoby et al. |
| 2006/0271961 A1 | 11/2006 | Jacoby et al. |
| 2006/0277098 A1 | 12/2006 | Chung et al. |
| 2006/0282856 A1 | 12/2006 | Errico et al. |
| 2006/0288041 A1 | 12/2006 | Plastina et al. |
| 2006/0293909 A1 | 12/2006 | Miyajima et al. |
| 2007/0005793 A1 | 1/2007 | Miyoshi et al. |
| 2007/0022437 A1 | 1/2007 | Gerken |
| 2007/0028171 A1 | 2/2007 | MacLaurin |
| 2007/0043766 A1 | 2/2007 | Nicholas et al. |
| 2007/0044010 A1 | 2/2007 | Sull et al. |
| 2007/0078714 A1 | 4/2007 | Ott, IV et al. |
| 2007/0079352 A1 | 4/2007 | Klein, Jr. |
| 2007/0083471 A1 | 4/2007 | Robbin et al. |
| 2007/0083553 A1 | 4/2007 | Minor |
| 2007/0100904 A1 | 5/2007 | Casey et al. |
| 2007/0106672 A1 | 5/2007 | Sighart et al. |
| 2007/0106693 A1 | 5/2007 | Houh et al. |
| 2007/0118657 A1 | 5/2007 | Kreitzer et al. |
| 2007/0118853 A1 | 5/2007 | Kreitzer et al. |
| 2007/0118873 A1 | 5/2007 | Houh et al. |
| 2007/0162502 A1 | 7/2007 | Thomas et al. |
| 2007/0214182 A1 | 9/2007 | Rosenberg |
| 2007/0238427 A1 | 10/2007 | Kraft et al. |
| 2007/0244880 A1 | 10/2007 | Martin et al. |
| 2007/0265870 A1 | 11/2007 | Song et al. |
| 2007/0269169 A1 | 11/2007 | Stix et al. |
| 2008/0010372 A1 | 1/2008 | Khedouri et al. |
| 2008/0016205 A1 | 1/2008 | Svendsen |
| 2008/0032723 A1 | 2/2008 | Rosenberg |
| 2008/0052371 A1 | 2/2008 | Partovi et al. |
| 2008/0091771 A1 | 4/2008 | Allen et al. |
| 2008/0120501 A1 | 5/2008 | Jannink et al. |
| 2008/0133601 A1 | 6/2008 | Martin Cervera et al. |

(56) References Cited

U.S. PATENT DOCUMENTS

| | | | |
|---|---|---|---|
| 2008/0133763 A1 | 6/2008 | Clark et al. |
| 2008/0208823 A1 | 8/2008 | Hicken |
| 2008/0270561 A1 | 10/2008 | Tang et al. |
| 2008/0319833 A1 | 12/2008 | Svendsen |
| 2009/0077220 A1 | 3/2009 | Svendsen et al. |
| 2009/0129671 A1 | 5/2009 | Hu et al. |

FOREIGN PATENT DOCUMENTS

| | | |
|---|---|---|
| GB | 2397205 A | 7/2004 |
| JP | 2005-321668 | 11/2005 |
| WO | 01/84353 A3 | 11/2001 |
| WO | 02/21335 A1 | 3/2002 |
| WO | 2004/017178 A2 | 2/2004 |
| WO | 2004/043064 A1 | 5/2004 |
| WO | 2005/026916 A2 | 3/2005 |
| WO | 2005/071571 A1 | 8/2005 |
| WO | 2006/126135 A2 | 11/2006 |

OTHER PUBLICATIONS

"Tour's Profile," http://mog.com/Tour, copyright 2006-2009 Mog Inc., printed Aug. 3, 2009, 11 pages.
Soundflavor DJ for iTunes, http://www.soundflavor.com/.
MusicIP—The Music Search Engine, http://www.musicip.com/.
last fm the social music revolution, http://www.last.fm/.
Webjay—Playlist Community, http://www.webjay.org/.
Better Propaganda—Free MP3s and music videos, http://www.betterpropaganda.com/.
Mercora—Music Search and Internet Radio Network, http://search.mercora.com/v6/_front/web.jsp.
MP3 music download website, eMusic, http://www.emusic.com/.
Welcome to the Musicmatch Guide, http://mmguide.musicmatch.com/.
UpTo11.net—Music Recommendations and Search, http://www.upto11.net/.
Loomia—Personalized Recommendations for Media, Content and Retail Sites, http://www.loomia.com/.
Try Napster free for 7 Days, http://www.napster.com/choose/index.html.
Apple—iPod+iTunes, http://www.apple.com/itunes/.
Pandora Internet Radio, http://www.pandora.com/.
MyStrands Download, http://www.mystrands.com/overview.vm.
Napster—All the Music You Want, http://www.napstercom/using_napster/all_the_music_you_want.html.
Take a look at the Future of Mobile Music :: Music GURU, http://www.symbian-freak.com/news/006/02/music_guru.htm.
Gracenote, http://www.gracenote.com/.
Wired News, http://www.wired.com/news/digiwood/1,57634-0.html.
"MUSICSTRANDS.COM Because Music is Social," 2006.
GenieLab.com grants music lovers' wishes, http://barometer.orst.edu/home/index.cfm?event=displayArticlePrinterFriendly&uStory_id=5c420acf-a1fb-448c-8ffd-39ec5c448b6f.
That canadian girl blog archive—GenieLab, http://www.thatcanadiangirl.co.uk/blog/2005/02/22/genielab/.
Digital Tech Life Download of the Week, http://www.digitaltechlife.com/category/download-of-the-week/.
Music Recommendations 1.0, http://www.macupdate.com/info.php/id/19575.
"Amazon.com: Online Shopping for Electronics, Apparel, Computers, Books, DVDs & m . . . ," http://www.amazon.com/, copyright 1996-2007 Amazon.com, Inc., printed Oct. 26, 2007, 4 pages.
"Apple—iPod classic," http://www.apple.com/ipodclassic./, printed Oct. 26, 2007, 1 page.
"Billboard.biz—Music Business—Billboard Charts—Album Sales—Concert Tours," http://www.billboard.biz/bbbiz/index.jsp, copyright 2007 Nielsen Business Media, Inc., printed Oct. 26, 2007, 3 pages.
"Bluetooth.com—Learn," http://www.bluetooth.com/Bluetooth/Learn/, copyright 2007 Bluetooth SIG, Inc., printed Oct. 26, 2007, 1 page.
"The Classic TV Database—Your Home for Classic TVl—www.classic-tv.com," http://www.classic-tv.com, copyright The Classic TV Database—www.classic-tv.com, printed Feb. 7, 2007, 3 pages.
"GenieLab::Music Recommendation System," http://web.archive.org/web/20060813000442/http://genielab.com/, copyright 2005 GenieLab, LLC, printed Oct. 26, 2007, 1 page.
"Gracenote Playlist," Revised Dec. 29, 2005, 2 pages.
"Gracenote Playlist Plus," Revised Dec. 29, 2005, 2 pages.
"IEEE 802.11—Wikipedia, the free encyclopedia," http://en.wikipedia.org/wiki/IEEE_802.11, printed Oct. 26, 2007, 5 pages.
"iLikeTM—Home," http://www.ilike.com/, copyright 2007 iLike, printed May 17, 2007, 2 pages.
"The Internet Movie Database (IMDb)," http://www.imdb.com/, copyright 1990-2007 Internet Movie Database Inc., printed Feb. 7, 2007, 3 pages.
"liveplasma music, movies, search engine and discovery engine," http://www.liveplasma.com, printed May 17, 2007, 1 page.
"Mongomusic.com—The Best Download mp3 Resources and Information. This website is for sale!," http://www.mongomusic.com/, printed May 17, 2007, 2 pages.
"MusicGremlin," http://www.musicgremlin.com/StaticContent.aspx?id=3, copyright 2005, 2006, 2007 MusicGremlin, Inc., printed Oct. 26, 2007, 1 page.
"MyStrands for Windows 0.7.3 Beta," copyright 2002-2006 ShareApple.com networks, printed Jul. 16, 2007, 3 pages.
"MyStrands for Windows Change Log," http://www.mystrands.com/mystrands/windows/changelog.vm, printed Jul. 16, 2007, 6 pages.
"FAQ," http://blog.pandora.com/faq/, copyright 2005-2006 Pandora Media, Inc., printed Aug. 8, 2006, 20 pages.
"Pandora Radio—Listen to Free Internet Radio, Find New Music," http://www.pandora.com/mgp, copyright 2005-2007 Pandora Media, Inc., printed Oct. 26, 2007, 1 page.
"Rhapsody—Full-length music, videos and more—Free," http://www.rhapsody.com/welcome.html, copyright 2001-2007 Listen.com, printed Feb. 7, 2007, 1 page.
"Yahoo! Messenger—Chat, Instant message, SMS, PC Calls and More," http://messengeryahoo.com/webmessengerpromo.php, copyright 2007 Yahoo! Inc., printed Oct. 26, 2007, 1 page.
"Music Downloads—Over 2 Million Songs—Try It Free—Yahoo! Music," http://music.yahoo.com/ymu/default.asp, copyright 2006 Yahoo! Inc., printed Feb. 7, 2007, 1 page.
"YouTube—Broadcast Yourself.," http://www.youtube.com/, copyright 2007 YouTube, LLC, printed Oct. 26, 2007, 2 pages.
"Mercora—Music Search and Internet Radio Network," http://www.mercora.com/overview.asp, copyright 2004-2006 Mercora, Inc., printed Aug. 8, 2006, 1 page.
"Instant Messenger—AIM—Instant Message Your Online Buddies for Free—AIM," http://dashboard.aim.com/aim, copyright 2007 AOL LLC, printed Nov. 8, 2007, 6 pages.
"Outlook Home Page—Microsoft Office Online," http://office.microsoft.com/en-us/outlook/default.aspx, copyright 2007 Microsoft Corporation, printed Nov. 8, 2007. 1 page.
"Thunderbird—Reclaim your inbox," http://www.mozilla.com/en-US/thunderbird/, copyright 2005-2007 Mozilla, printed Nov. 8, 2007, 2 pages.
"RYM FAQ—Rate Your Music," http://rateyourmusic.com/faq/, copyright 2000-2007 rateyourmusic.com, printed Nov. 8, 2007, 14 pages.
"Trillian (software)—Wikipedia, the free encyclopedia," http://en.wikipedia.org/wiki/Trillian_(instant_messenger), printed Nov. 8, 2007, 11 pages.
"Not safe for work—Wikipedia, the free encyclopedia," http://en.wikipedia.org/wiki/Work_safe, printed Nov. 8, 2007, 2 pages.
"Zune.net—How-To-Share Audio Files Zune to Zune," http://web.archive.org/web/20070819121705/http://www.zune.net/en-us/support/howto/z . . . , copyright 2007 Microsoft Corporation, printed Nov. 14, 2007, 2 pages.
"LAUNCHcast Radio—Yahoo! Messenger," http://messenger.yahoo.com/launch.php, copyright 2007 Yahoo! Inc., printed Nov. 8, 2007, 1 page.

(56) References Cited

OTHER PUBLICATIONS

"Goombah—Preview," http://www.goombah.com/preview.html, printed Jan. 8, 2008, 5 pages.

Jeff Mascia et al., "Lifetrak: Music in Tune With Your Life," copyright 2006, 11 pages.

Jun Wang et al., "Music Recommender System for Wi-Fi Walkman," Delft University of Technology, 23 pages.

"ChoiceStream, Technology Brief, Review of Personalization Technologies: Collaborative Filtering vs. ChoiceStream's Attributized Bayesian Choice Modelling."

Badrul M. Sarwar et al., "Recommendation Systems for Large-scale E-Commerce: Scalable Neighborhood Formation Using Clustering,"2002.

"Last.fm" Wikipedia, http://en.wikipedia.org/wiki/Last.fm.

"MusicStrands Rusties Funding Following Mobile Announcement," http://www.digitalmusicnews.com/results?title=musicstrands, Digital Music News, Mar. 6, 2006, p. 3 of 5.

"Yahoo Music Jukebox" from Wikipedia, http://en.wikipedia.org/wiki/Yahoo_music_engine.

Mercora—Music Search and Internet Radio Network, http://www.mercora.com/overview.asp.

"LimeWire" Wikipedia, http://en.wikipedia.org/wiki/Limewire.

* cited by examiner

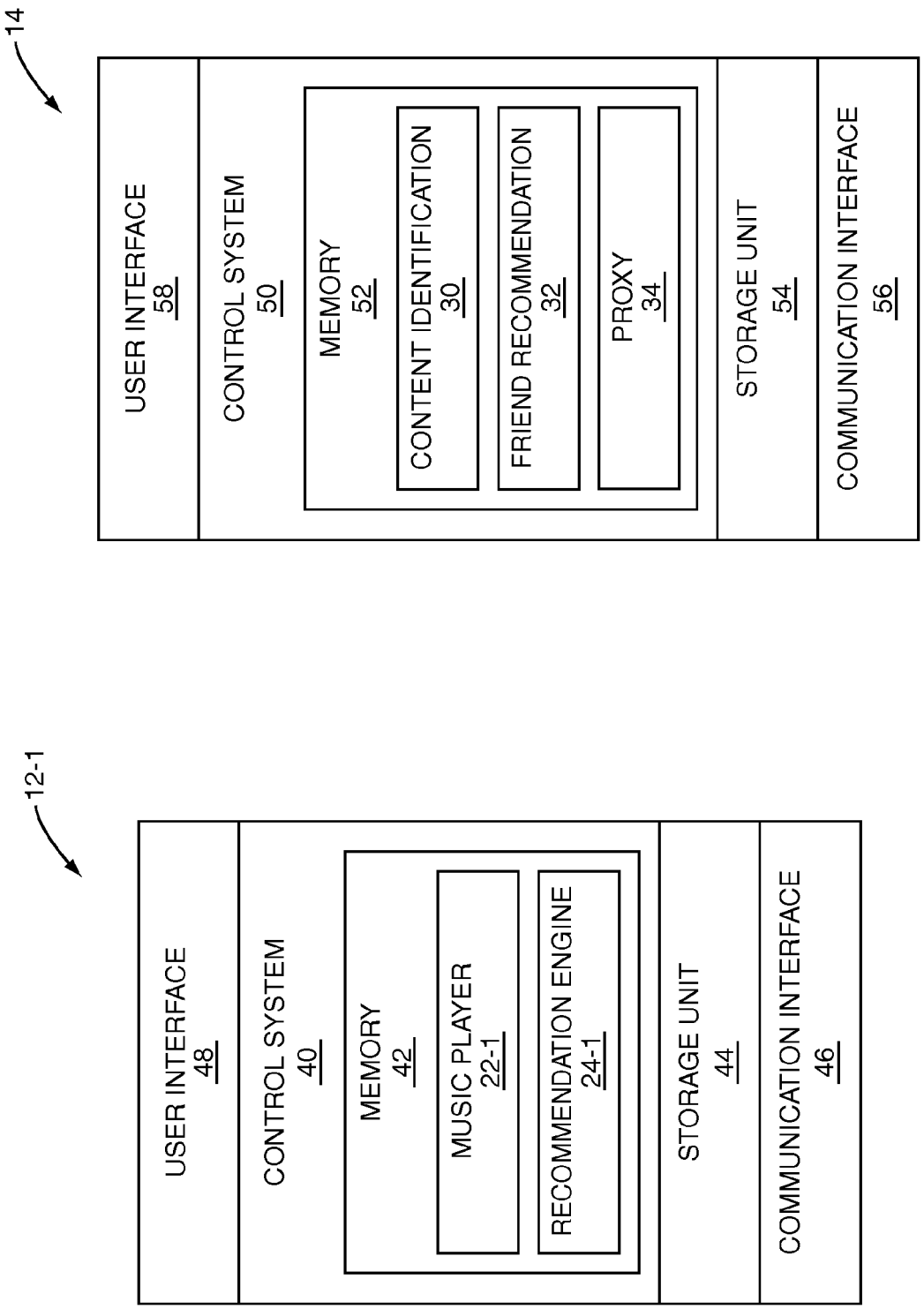

MATCHING PARTICIPANTS IN A P2P RECOMMENDATION NETWORK LOOSELY COUPLED TO A SUBSCRIPTION SERVICE

FIELD OF THE INVENTION

The present invention relates to a Peer-to-Peer (P2P) media recommendation network and more specifically relates to matching participants in a P2P recommendation network.

BACKGROUND OF THE INVENTION

In recent years, there has been an enormous increase in the amount of digital media, such as music, available online. Services such as Apple's iTunes enable users to legally purchase and download music. Other services such as Yahoo! Music Unlimited and RealNetwork's Rhapsody provide access to millions of songs for a monthly subscription fee. As a result, music has become much more accessible to listeners worldwide. However, the increased accessibility of music has only heightened a long-standing problem for the music industry, which is namely the issue of linking audiophiles with new music that matches their listening preferences.

Many companies, technologies, and approaches have emerged to address this issue of music recommendation. Some companies have taken an analytical approach. They review various attributes of a song, such as melody, harmony, lyrics, orchestration, vocal character, and the like, and assign a rating to each attribute. The ratings for each attribute are then assembled to create a holistic classification for the song that is then used by a recommendation engine. The recommendation engine typically requires that the user first identify a song that he or she likes. The recommendation engine then suggests other songs with similar attributes. Companies using this type of approach include Pandora (http://www.pandora.com), SoundFlavor (http://www.soundflavor.com), MusicIP (http://www.musicip.com), and MongoMusic (purchased by Microsoft in 2000).

Other companies take a communal approach. They make recommendations based on the collective wisdom of a group of users with similar musical tastes. These solutions first profile the listening habits of a particular user and then search similar profiles of other users to determine recommendations. Profiles are generally created in a variety of ways such as looking at a user's complete collection, the playcounts of their songs, their favorite playlists, and the like. Companies using this technology include Last.fm (http://www.last.fm), Music Strands (http://www.musicstrands.com), WebJay (http://www.webjay.org), Mercora (http://www.mercora.com), betterPropaganda (http://www.betterpropaganda.com), Loomia (http://www.loomia.com), eMusic (http://www.emusic.com), musicmatch (http://www.m-mguide.musicmatch.com), genielab (http://genielab.com/), upto11 (http://www.upto11.net/), Napster (http://www.napster.com), and iTunes (http://www.itunes.com) with its celebrity playlists.

The problem with these traditional recommendation systems is that they fail to consider peer influences. One approach that addresses this issue is commonly owned and assigned U.S. patent application Ser. No. 11/484,130, entitled P2P NETWORK FOR PROVIDING REAL TIME MEDIA RECOMMENDATIONS, filed Jul. 11, 2006, which is hereby incorporated herein by reference in its entirety. In general, this approach provides for real-time Peer-to-Peer (P2P) media recommendations. In such a system, when the number of peer devices is large, there is a need for a method of intelligently recommending "friends" to a particular user for the purpose of identifying participants for a P2P recommendation group.

SUMMARY OF THE INVENTION

The present invention relates to a system and method for matching participants in a Peer-to-Peer (P2P) recommendation network that is loosely coupled to a subscription music service. In general, the system includes a central server and a number of peer devices. For each of the peer devices, an associated user is either a subscriber to the subscription music service or a non-subscriber. When a user of a peer device desires to identify new friends with which to exchange recommendations in the P2P recommendation network, a friend recommendation function of the central server identifies new friends for the user of the peer device based on the user's status as either a subscriber or a non-subscriber to the subscription music service.

More specifically, if the user is a subscriber, the friend recommendation function compares a user profile and a music collection of the user to user profiles and music collections of other users in the P2P recommendation network that are also subscribers to the subscription music service. A number of the other subscribers having user profiles that have a high correlation to the user profile of the user of the peer device and music collections that have a low correlation to the music collection of the user of the peer device are selected as the new friends for the user of the peer device. If the user is a non-subscriber, the friend recommendation function compares a music collection of the user to music collections of other non-subscribers in the P2P recommendation network. A number of the other non-subscribers having music collections that have a high correlation to the music collection of the user of the peer device are selected as the new friends for the user of the peer device.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 11 is a block diagram of one of the peer devices according to one embodiment of the present invention;

FIG. 12 is a block diagram of the central server of FIG. 1 according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
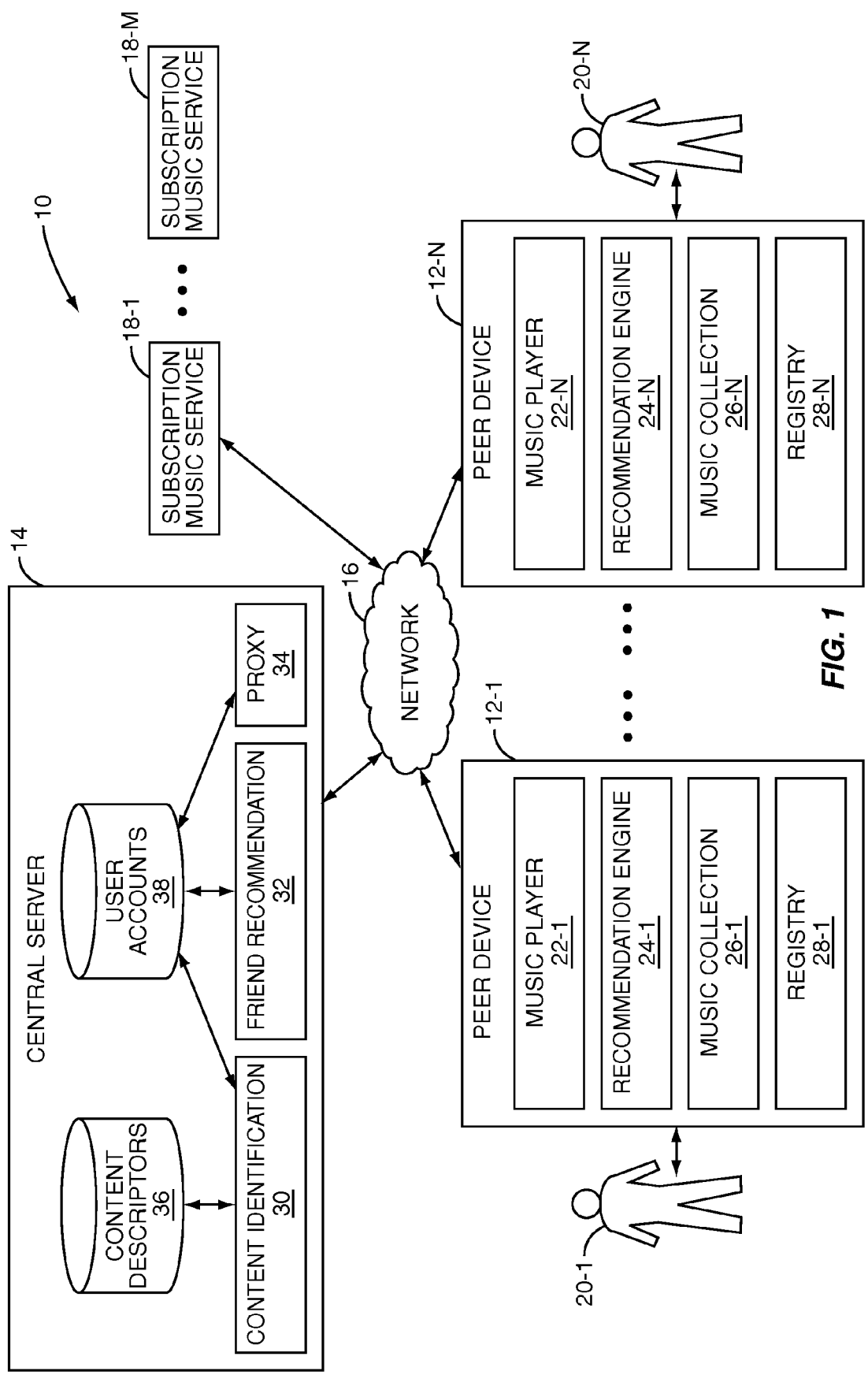
FIG. 1 illustrates a system incorporating a Peer-to-Peer (P2P) media recommendation network according to one embodiment of the present invention.

FIG. 1 illustrates a system 10 incorporating a P2P recommendation network for providing real time song recommendations according to one embodiment of the present invention. Note that while the discussion herein focuses on song recommendations for clarity and ease of discussion, the present invention is equally applicable to providing recommendations for other types of media presentations such as video presentations, as will be apparent to one of ordinary skill in the art upon reading this disclosure. Exemplary video presentations are movies, television programs, and the like.

In general, the system 10 includes a number of peer devices 12-1 through 12-N connected to a central server 14 via a network 16, which may be a distributed public network such as, but not limited to, the Internet. The peer devices 12-1 through 12-N and the central server 14 form the P2P recommendation network. The system 10 also includes a number of subscription music services 18-1 through 18-M, where users 20-1 through 20-N of the peer devices 12-1 through 12-N are either subscribers of one or more of the subscription music services 18-1 through 18-M or non-subscribers. Note that while multiple subscription music services 18-1 through 18-M are shown, the system 10 may include any number of one or more subscription music services.

The peer devices 12-1 through 12-N may be, for example, personal computers, portable media players, mobile telephones, Personal Digital Assistants (PDAs), or the like having audio playback and network capabilities. Using the peer device 12-1 as an example, the peer device 12-1 includes a music player 22-1, a recommendation engine 24-1, a music collection 26-1, and a registry 28-1. Note that this discussion is equally applicable to all of the peer devices 12-1 through 12-N. The music player 22-1 may be implemented in software, hardware, or a combination of hardware and software.

In general, the music player 22-1 operates to play songs from the music collection 26-1. The recommendation engine 24-1 may be implemented in software, hardware, or a combination of hardware and software. The recommendation engine 24-1 may alternatively be incorporated into the music player 22-1. The music collection 26-1 includes any number of songs stored in one or more digital storage units such as, for example, one or more hard-disc drives, one or more memory cards, internal Random-Access Memory (RAM), one or more associated external digital storage devices, or the like. Note that if the peer device 12-1 includes a log-in feature, the music collection 26-1 may vary depending on the user 20-1 that is currently logged-in at the peer device 12-1.

The registry 28-1 operates to store a registry entry for each song in the music collection 26. In one embodiment, each registry entry includes a Globally Unique Identifier (GUID) for the corresponding song in the music collection 26-1 and a reference to the song in the local storage of the peer device 12-1. In addition or as an alternative to the GUID, the registry entry may include metadata identifying the corresponding song such as, for example, the title and artist of the song. The registry entry may also include a Uniform Resource Locator (URL) or other network reference to the song at one or more remote content sources such as one or more of the subscription music services 18-1 through 18-M, a score of the song computed by the recommendation engine 24-1 as discussed below, and a status of the song, where the status may be an indicator of download progress if the song is currently being downloaded from one of the subscription music services 18-1 through 18-M.

In operation, each time a song is played by the music player 22-1, the recommendation engine 24-1 operates to provide a recommendation identifying the song to a number of other peer devices associated with other users in a P2P recommendation group of the user 20-1 of the peer device 12-1. In one embodiment, the P2P recommendation group of the user 20-1 of the peer device 12-1 includes a number of the other users 20-2 through 20-N of the other peers devices 12-2 through 12-N that are on a "friends list" of the user 20-1 of the peer device 12-1. The recommendation does not include the song. In one embodiment, the recommendation may be a recommendation file including the GUID for the song and optionally the URL or other network reference enabling the other peer devices to obtain the song from one or more of the subscription music services 18-1 through 18-M. In addition, as discussed below in detail, the recommendation engine 24-1 operates to programmatically, or automatically, select a next song to be played by the music player 22-1 from a group of songs including songs identified by recommendations received from one or more of the other peer devices 12-2 through 12-N in the P2P recommendation group of the peer device 12-1 based on user preferences of the user 20-1 of the peer device 12-1. If the selected song is not stored locally at the peer device 12-1, the peer device 12-1 may obtain the selected song from one of the subscription music services 18-1 through 18-M.

In this embodiment, the central server 14 includes a content identification function 30, a friend recommendation function 32, and a proxy function 34. Note that while the central server 14 is illustrated as a single server, it may alternatively be implemented as a number of servers that operate in a collaborative fashion for purposes of load balancing and redundancy. The content identification function 30 is optional and may be implemented in software, hardware, or a combination thereof. In operation, the content identification function 30 identifies songs in the music collections 26-1 through 26-N of the users 20-1 through 20-N of the peer devices 12-1 through 12-N by comparing identification parameters for the songs to content descriptors in a content descriptors database 36. The content descriptors database 36 operates to store a content descriptor for each of a number of songs known to the central server 14. In one embodiment, the content descriptors database 36 stores a content descriptor for each song hosted by one or more of the subscription music services 18-1 through 18-M. Each content descriptor may include one or more digital fingerprints for the associated song, the GUID for the song, metadata for the song, and a URL for the song at one or more of the subscription music services 18-1 through 18-M. The metadata for the song may include, for example, the title of the song, artist, album, date of release, lyrics, an album cover image, and the like.

The friend recommendation function 32 may be implemented in software, hardware, or combination thereof. In general, using the peer device 12-1 as an example, the friend recommendation function 32 operates to select friends, or new friends, for the user 20-1 of the peer device 12-1 upon request. Note that friends may also be entered manually by the user 20-1. Generally, the friend recommendation function 32 selects new friends for the peer device 12-1 based on information stored in a user accounts database 38. For each of the users 20-1 through 20-N, the user accounts database 38 stores a user account. Using the user 20-1 as an example, the user account of the user 20-1 includes subscriber status information indicating whether the user 20-1 is a subscriber of one or more of the subscription music services 18-1 through 18-M or a non-subscriber, a list of songs in the music collection 26-1, and a user profile. The user account may also include a friends list for the user 20-1 of the peer device 12-1. In addition or alternatively, the friends list may be stored by the peer device 12-1. The friends list identifies one or more of the other users 20-2 through 20-N in the P2P recommendation group of the user 20-1 of the peer device 12-1. The user account may also include a play history of the peer device 12-1 and an online status of the peer device 12-1.

The user profile of the user 20-1 stored in the corresponding user account includes statistical information describing the music collection 26-1 such as, for example, a genre distribution, an artist distribution, and a release year distribution. In addition or alternatively, the user profile may include statistical information describing the songs in the play history of the user 20-1 of the peer device 12-1 such as, for example, a genre distribution, an artist distribution, and a release year distribution. In addition, the user profile may include information identifying the user 20-1 such as a name, address, e-mail address, and the like and demographic information describing the user 20-1 such as age, sex, marital status, and the like.

Note that the list of songs in the music collection 26-1 stored in the corresponding user account may be generated by the central server 14 in various manners. In a first embodiment, the songs in the music collection 26-1 are identified by the content identification function 30. In another embodiment, the list of songs in the music collection 26-1 may be generated by monitoring recommendations from the peer device 12-1 provided to others of the peer devices 12-1 through 12-N via the proxy function 34.

The proxy function 34 may be implemented in software, hardware, or a combination thereof. In general, the proxy function 34 operates as an intermediary for sending recommendations among the peer devices 12-1 through 12-N. In addition, the proxy function 34 may perform various functions such as filtering recommendations based on various filtering criteria, monitoring recommendations to ascertain play histories for the users 20-1 through 20-N of the peer devices 12-1 through 12-N, and monitoring recommendations to generate the lists of songs in the music collections 26-1 through 26-N stored in the user accounts database 38.

The subscription music services 18-1 through 18-M may each be a service hosted by a server connected to the network 16. Exemplary subscription based music services that may be modified to operate according to the present invention are Yahoo! Music Unlimited digital music service and RealNetwork's Rhapsody digital music service. Note that one or more of the subscription music services 18-1 through 18-M may alternatively be hosted by the central server 14. Further, while the subscription services 18-1 through 18-M are discussed herein as music services, the present invention is not limited thereto. For example, each of the subscription services 18-1 through 18-M may alternatively be video services. Still further, some of the subscription services 18-1 through 18-M may be music services while others are video services.

Figure 2:
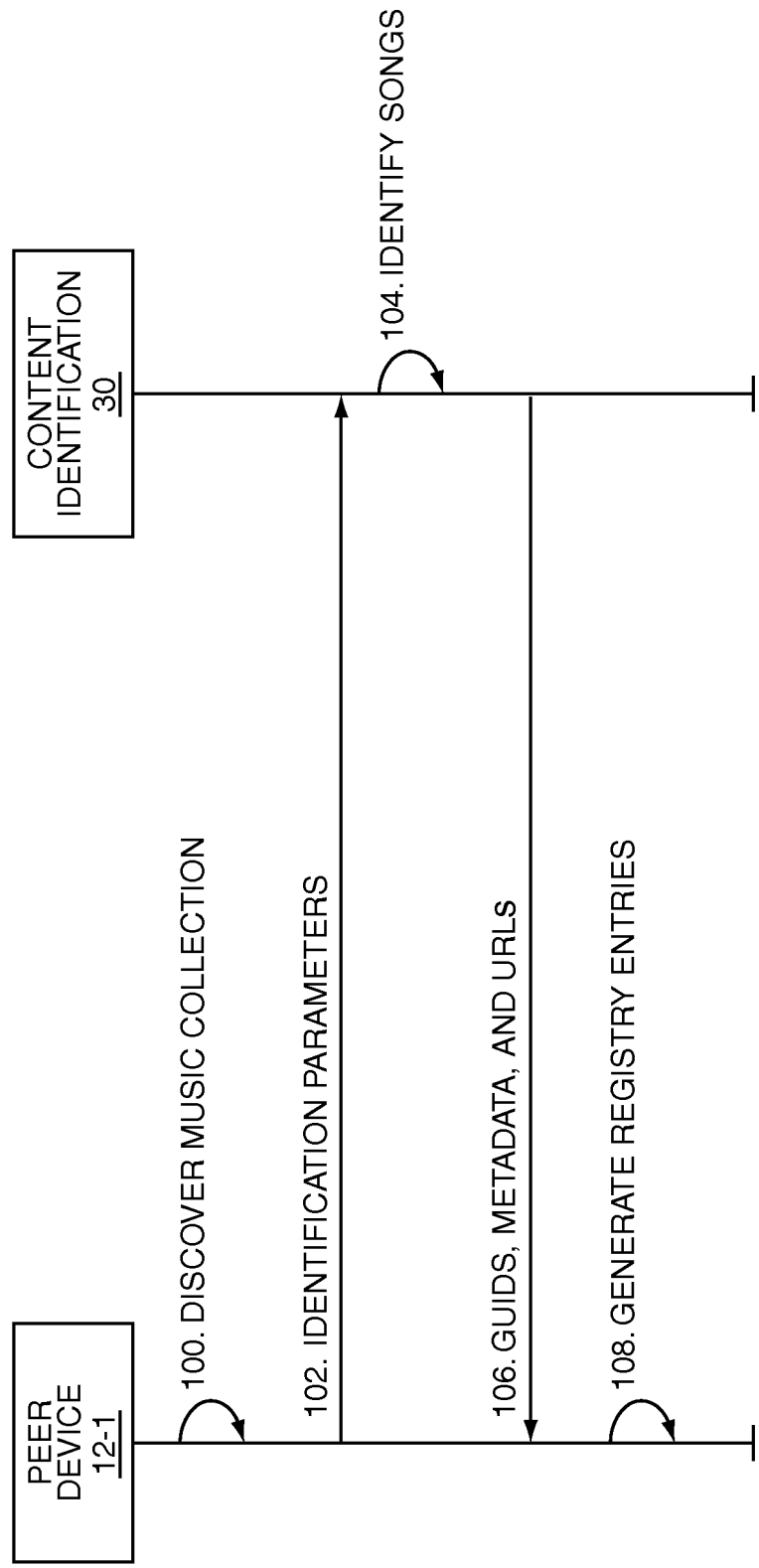
FIG. 2 illustrates the operation of the content identification function of the central server of FIG. 1 according to one embodiment of the present invention.

FIG. 2 illustrates the operation of the content identification function 30 according to one embodiment of the present invention. While this example focuses on the identification of multiple songs, the process is equally applicable to a single song. First, the peer device 12-1 discovers the music collection 26-1 (step 100). For example, the peer device 12-1 may scan the local storage of the peer device 12-1 or a select portion thereof for songs. As another example, the peer device 12-1 may detect new songs downloaded from a remote content source, imported from a CD, or the like.

The peer device 12-1 then provides one or more identification parameters for each of the songs to the content identification function 30 (step 102). In a first embodiment, the identification parameters include one or more digital fingerprints for each of the songs. In order to generate the fingerprints, the peer device 12-1 may analyze one or more segments of a song to determine, for example, beats-per-minute and/or compute a Fast Fourier Transform (FFT). The segments of the song analyzed to generate the fingerprints may be selected at random or in some predetermined fashion. For a more detailed discussion of generating fingerprints for a song and identifying the song based on the fingerprints, see U.S. Pat. No. 6,990,453, entitled SYSTEM AND METHODS FOR RECOGNIZING SOUND AND MUSIC SIGNALS IN HIGH NOISE AND DISTORTION, issued Jan. 24, 2006, which is hereby incorporated by reference in its entirety.

In a second embodiment, the identification parameters include one or more samples of each of the songs, rather than fingerprints. The content identification function 30 may then generate fingerprints for the songs using the samples of the songs. In a third embodiment, the identification parameters include metadata describing each of the songs and optionally fingerprints for a select number of the songs. The fingerprints of the select number of songs may be used for verification purposes in order to determine whether the peer device 12-1 is spoofing the content identification function 30 with metadata for songs that are not in fact stored in the music collection 26-1 of the peer device 12-1. In a fourth embodiment, the identification parameters include metadata describing each of the songs and one or more samples of a select number of the songs. The samples of the select number of songs may be used to generate fingerprints for the songs, which may then be used for verification purposes as described above.

The content identification function 30 then identifies the songs using the song identification parameters and the content descriptors in the content descriptors database 36 (step 104). The manner in which the songs are identified varies depending on the identification parameters. If the identification parameters are fingerprints for the songs, the content identification function 30 may identify the songs by comparing the fingerprints to the fingerprints of the content descriptors in the content descriptors database 36. A song is identified when the fingerprints for the song match the fingerprints of a particular content descriptor. If the identification parameters are samples of the songs, the content identification function 30 may generate fingerprints for the songs from the samples and then identify the songs by comparing the fingerprints to the fingerprints of the content descriptors. If the identification parameters include metadata describing the songs, the content identification function 30 may identify the songs by comparing the metadata to the metadata of the content descriptors. When the metadata of a song matches the metadata of a particular content descriptor, the song is identified as the song corresponding to the matching content descriptor.

In this example, once the songs are identified, the GUIDs for the songs from the corresponding content descriptors are provided to the peer device 12-1 (step 106). Optionally, the metadata for the songs and the URLs for obtaining the songs from one or more of the subscription music services 18-1 through 18-M may also be provided to the peer device 12-1. The peer device 12-1 then generates registry entries for the songs in the registry 28-1 (step 108). The registry entries may include the GUIDs for the songs. In addition or as an alternative to the GUIDs, the registry entries may include metadata describing the songs. The registry entries may also include URLs for the songs. The metadata provided to the peer device 12-1 may additionally or alternatively be used to add, update, or correct metadata for the songs stored in the corresponding song files. Note that in an alternative embodiment, the registry entries may be implemented within the headers of the corresponding song files.

It should be noted that in addition to or as an alternative to the content identification function 30, various schemes may be used to obtain or otherwise provide the GUIDs for the songs in the music collections 26-1 through 26-N. For example, if the songs are downloaded from a remote content source such as one of the subscription music services 18-1 through 18-M, the GUIDs may be provided along with the songs or be included as metadata within the song files. As another example, if the songs are imported from a Compact Disc (CD), the GUIDs for the songs may be obtained from a remote database as part of the importing process. More specifically, when importing the songs from the CD, information such as, for example, the number of tracks on the CD and the length of each track may be provided to a remote service such as Gracenote (http://www.gracenote.com). In response, the remote service may provide the GUIDs and optionally metadata to the corresponding peer device 12-1 through 12-N for each of the songs imported from the CD.

Figure 3:
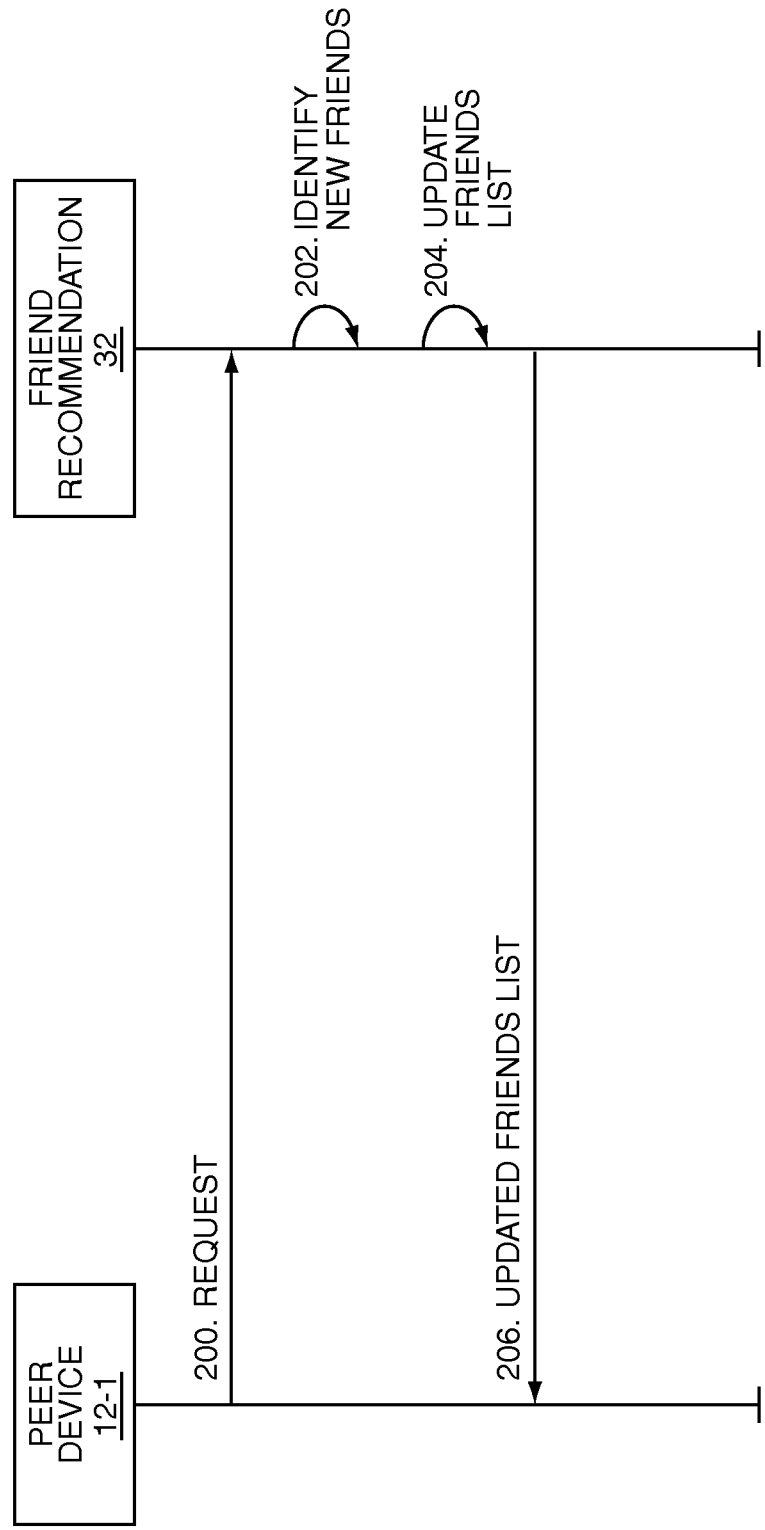
FIG. 3 illustrates the operation of the friend recommendation function of the central server of FIG. 1 according to one embodiment of the present invention.

FIG. 3 illustrates the operation of the friend recommendation function 32 of the central server 14 according to one embodiment of the present invention. Using the peer device 12-1 as an example, the peer device 12-1 first sends a request for new friends to the friend recommendation function 32 (step 200). The request may be initiated by the user 20-1 when the user 20-1 desires to locate new friends for the P2P recommendation group of the user 20-1 of the peer device 12-1. The P2P recommendation group is defined by, for example, the friends list of the user 20-1 of the peer device 12-1. The peer device 12-1 receives recommendations from the other peer devices of the users in the P2P recommendation group of the user 20-1 and may further provide recommendations to the other peer devices of the users in the P2P recommendation group of the user 20-1. The request may be initiated when the user 20-1 currently has no friends in the user's friends list or when the user 20-1 desires to add one or more friends to the user's friends list. In addition, the request may indicate the number of new friends that the user 20-1 desires to locate.

Upon receiving the request at the central server 14, the friend recommendation function 32 identifies new friends for the user 20-1 of the peer device 12-1 (step 202). As discussed below, the friend recommendation function 32 selects the new friends from the other users 20-2 through 20-N of the other peer devices 12-2 through 12-N differently depending on whether the user 20-1 is a subscriber of one or more of the subscription music services 18-1 through 18-M or a non-subscriber. Once the new friends are selected, the friend recommendation function 32 may update the friends list of the user 20-1 to include the new friends (step 204). Note that the recommendation engine 32 may request approval from the user 20-1 before adding the new friends to the friends list of the user 20-1. The friend recommendation function 32 may also provide the updated friends list to the peer device 12-1 (step 206). By adding the new friends to the friends list of the user 20-1 and optionally providing the updated friends list to the peer device 12-1, the central server 14 effects addition of the peer devices associated with the new friends to the P2P recommendation group of the user 20-1 of the peer device 12-1.

Figure 4:
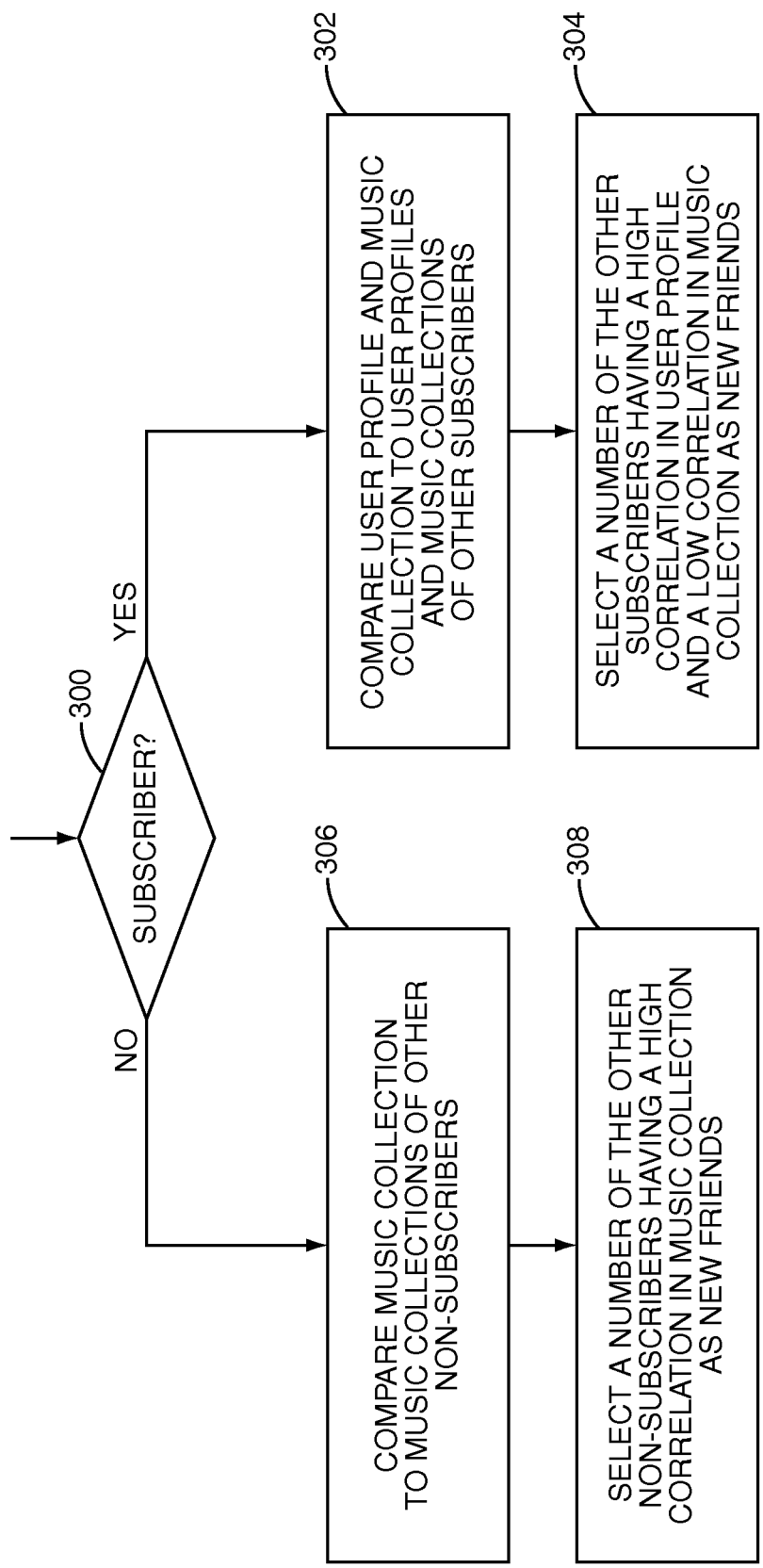
FIG. 4 is a more detailed illustration of the operation of the friend recommendation function of the central server of FIG. 1 according to one embodiment of the present invention.

FIG. 4 is a more detailed illustration of the operation of the friend recommendation function 32 according to one embodiment of the present invention. Again, the peer device 12-1 and the user 20-1 are used as an example. In response to a request for new friends from the peer device 12-1, the friend recommendation function 32 determines whether the user 20-1 is a subscriber of one or more of the subscription music services 18-1 through 18-M or a non-subscriber (step 300). This determination may be made by examining the user account of the user 20-1. If the user 20-1 is a subscriber, the friend recommendation function 32 compares the user profile and the list of songs in the music collection 26-1 stored in the user account of the user 20-1 to the user profiles and the list of songs in the music collections of a number of the other users 20-2 through 20-N that are also subscribers of one or more of the subscription music services 18-1 through 18-M (step 302).

The friend recommendation function 32 then selects a number of the other subscribers having user profiles that have a high correlation to the user profile of the user 20-1 and music collections that have a low correlation to the music collection 26-1 of the user 20-1 at the peer device 12-1 as new friends for the user 20-1 of the peer device 12-1 (step 304). As used herein, in one embodiment, a low correlation between two music collections occurs when the two music collections have less than a static or dynamic threshold number of songs in common. For example, a number of the other subscribers with less than X songs in common with the user 20-1 may be said to have a low correlation in music collections, where X may be a static threshold or a dynamic threshold selected such that the desired number of new friends are selected. In another embodiment, a low correlation between two music collections occurs when less than a static or dynamic threshold percentage of the songs in one of the music collections is also in the other music collection.

In a similar fashion, two user profiles have a high correlation when the statistical information in the user profiles are substantially similar in that they indicate that the users like the same genres of music, the same artists, the same time period, or any combination thereof. More specifically, the statistical information may include, for example, a genre distribution, an artist distribution, and a release year distribution. The genre distribution for a user may be computed by determining the number of songs in the corresponding music collection in each of a number of genres and dividing the number of songs in each genre by the total number of songs in the music collection in order to normalize the results. In a similar fashion, the artist distribution and the release year distribution may be computed. Two user profiles may have a high correlation when one or more of the genre distributions, the artist distributions, and the release year distributions for the two user profiles are substantially the same. For example, a score indicative of a similarity of the statistical information from two user profiles may be generated. The score may then be compared to a threshold score to determine whether the two profiles are substantially similar (i.e., that the corresponding users have similar tastes in music). The score may be generated using, for example, a least mean squared algorithm that compares the statistical information for the two profiles.

Note that when the user 20-1 is a subscriber, it is beneficial to select new friends having music collections that have a low correlation to the music collection 26-1 of the user 20-1 such that the peer device 12-1 is more likely to receive recommendations for new songs that are not already in the music collection 26-1. Thus, it enables the user 20-1 to experience new songs. Further, by selecting users having user profiles that have a high correlation to the user profile of the user 20-1, the friend recommendation function 32 ensures that the new friends have tastes in music similar to the tastes of the user 20-1.

If the user 20-1 is a non-subscriber, the friend recommendation function 32 compares the music collection 26-1 to the music collections of others of the users 20-1 through 20-N that are also non-subscribers (step 306). More specifically, the friend recommendation function 32 compares the list of songs in the music collection 26-1 stored in the user account of the user 20-1 to the lists of songs for other ones of the users 20-1 through 20-N that are also non-subscribers. The friend recommendation function 32 then selects a number of the other non-subscribers having music collections that have a high correlation with the music collection 26-1 of the user 20-1 as the new friends for the user 20-1 of the peer device 12-1 (step 308). As used herein, in one embodiment, a high correlation between two music collections occurs when the two music collections have greater than a static or dynamic threshold number of songs in common or have greater than a static or dynamic percentage of their songs in common. For example, a number of the other non-subscribers having more than X songs in common with the user 20-1 may be said to have a high correlation in music collections, where X may be a static threshold or a dynamic threshold selected such that the desired number of new friends is selected.

Note that when the user 20-1 is a non-subscriber, it is beneficial to select new friends having music collections that have a high correlation to the music collection 26-1 of the user 20-1 such that the peer device 12-1 is more likely to receive recommendations for songs that are already in the music collection 26-1. This is beneficial because the peer device 12-1 is unable to access new songs at the subscription music services 18-1 through 18-M. Also note that the friend recommendation function 32 may also consider other user profile information, play history, user preferences, or the like when selecting the new friends for the user 20-1 of the peer device 12-1.

Figure 5:
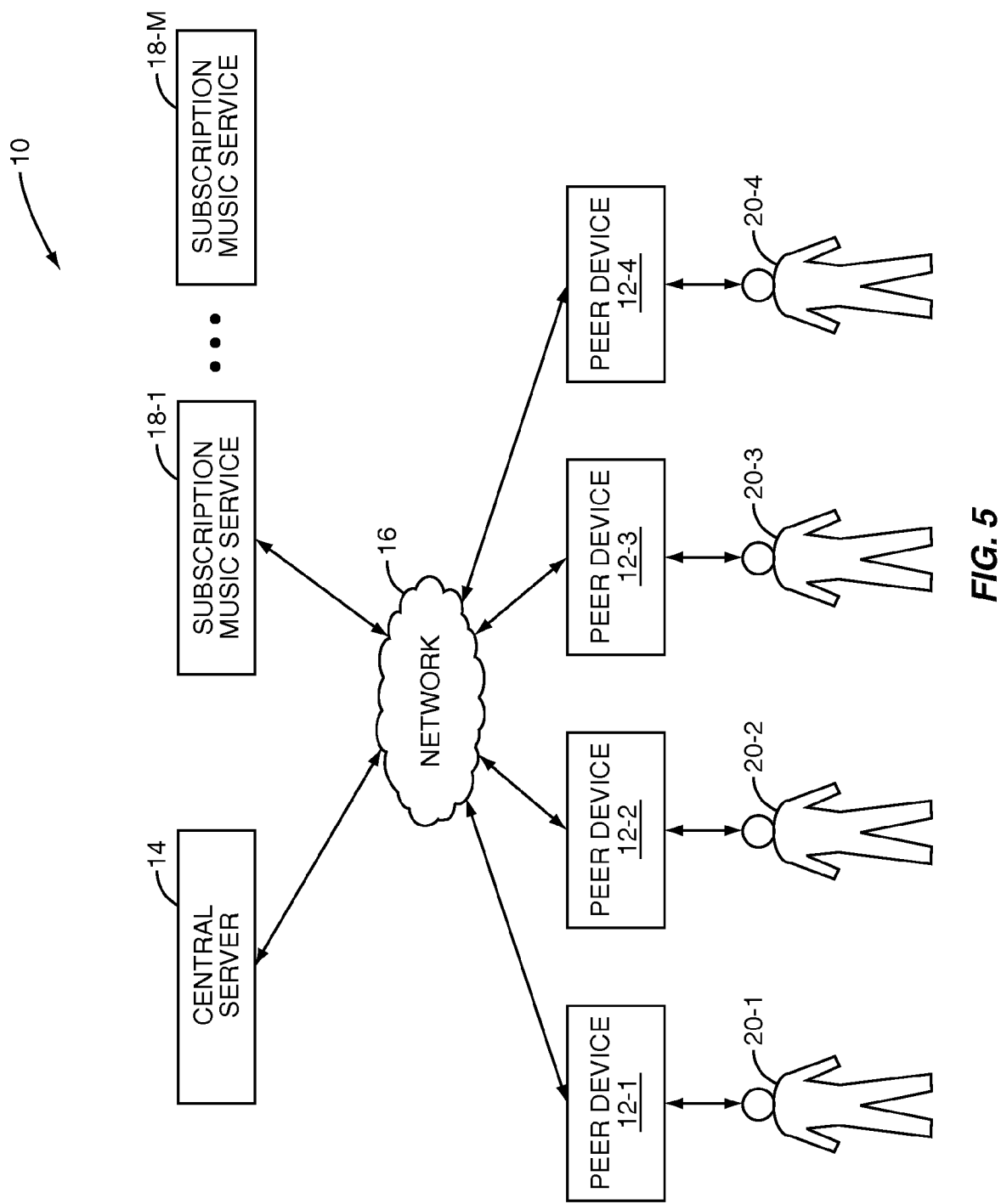
FIG. 5 illustrates the system of FIG. 1 with respect to a single P2P recommendation group according to one embodiment of the present invention.

FIG. 5 illustrates the system 10 with respect to the P2P recommendation group of the user 20-1 of the peer device 12-1. As an example, the users 20-2 and 20-3 of the peer devices 12-2 and 12-3 are on the friends list of the user 20-1, and user 20-4 of the peer device 12-4 may be an new friend of the user 20-1 identified by the friend recommendation function 32 of the central server 14 and added to the friends list of the user 20-1. As such, according to one embodiment of the present invention, recommendations are exchanged between the peer devices 12-1 through 12-4 in real-time, or substantially in real-time, as songs are played.

Figure 6:
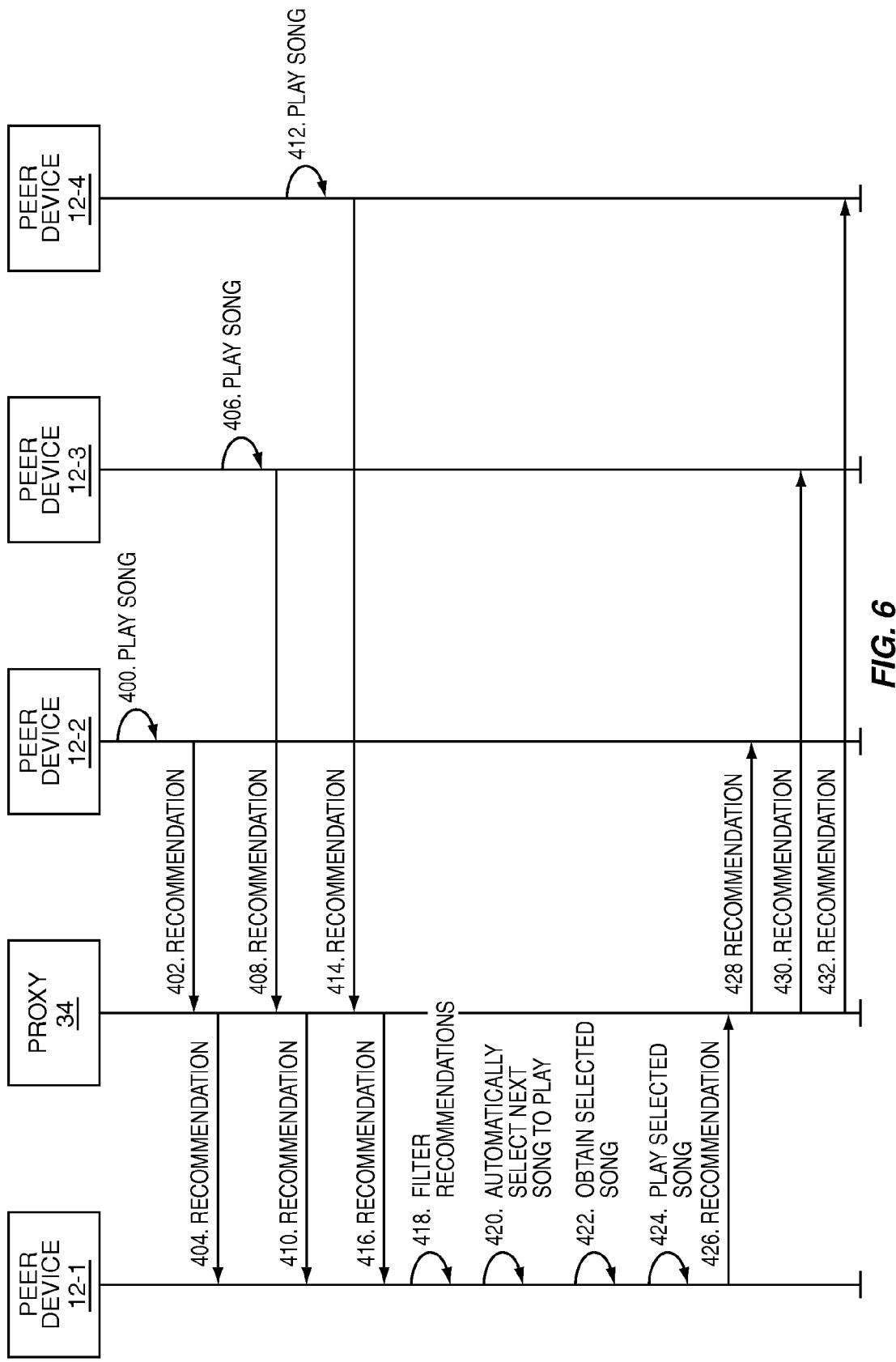
FIG. 6 illustrates the operation of the P2P recommendation group of FIG. 5 to exchange real-time media recommendations according to one embodiment of the present invention.

FIG. 6 illustrates the exchange of recommendations between the peer devices 12-1 through 12-4 according to one embodiment of the present invention. In this example, the peer device 12-2 first plays a song and, in response, provides a song recommendation identifying the song to the proxy function 34 of the central server 14 (steps 400-402). Optionally, the proxy function 34 may process the recommendation to provide various functions. Using the peer device 12-1 as an example, the proxy function 34 may determine whether the recommended song is included in the music collection 26-1 of the user 20-1 of the peer device 12-1 by comparing, for example, the GUID from the recommendation to the list of songs in the music collection 26-1. If the recommendation is for a song that is not part of the music collection 26-1 of the user 20-1 of the peer device 12-1, the proxy function 34 may insert a URL for obtaining the song from one or more of the subscription music services 18-1. In one embodiment, the proxy function 34 inserts a URL(s) for obtaining the song from one or more of the subscription music services 18-1 through 18-M to which the user 20-1 is subscribed or a URL for one of the subscription music services 18-1 through 18-M that is preferred by the user 20-1.

The proxy function 34 may additionally or alternatively filter recommendations based on various criteria. For example, the proxy function 34 may filter recommendations such that the peer device 12-1 only receives recommendations for songs in the music collection 26-1. This may be beneficial if the user 20-1 is a non-subscriber. As another example, the proxy function 34 may filter recommendations such that the peer device 12-1 only receives recommendations for songs in the music collection 26-1 or accessible to the peer device 12-1 from one or more of the subscription music services 18-1 through 18-M. This may be beneficial where the user 20-1 is a subscriber of one or more of the subscription music services 18-1 through 18-M. The proxy function 34 may also filter the recommendations based on filtering criteria such as, for example, user, genre, artist, title, album, lyrics, date of release, or the like. The filtering criteria may be defined by the user 20-1 of the peer device 12-1.

The proxy function 34 may also monitor the recommendations to generate and store the play history for users 20-1 through 20-4 of the peer devices 12-1 through 12-4. Using the user 20-1 as an example, the play history may include a list of GUIDs and time stamps corresponding to the recommendations received by the proxy function 34 from the peer device 12-1 while the user 20-1 is logged-in or otherwise using the peer device 12-1.

The proxy function 34 forwards the recommendation to the peer device 12-1 (step 404). While not illustrated for clarity and ease of discussion, the proxy function 34 may also send the recommendation to the peer devices 12-3 and 12-4. Note that the proxy function 34 may identify the peer devices 12-1, 12-3, and 12-4 to which the recommendation is to be forwarded using, for example, the friends list of the user 20-2 of the peer device 12-2 stored in the user accounts database 38. Alternatively, the recommendation from the peer device 12-2 may identify the desired recipients of the recommendation.

Like the peer device 12-2, the peer device 12-3 also plays a song and sends a song recommendation to the peer device 12-1 via the proxy function 34 of the central server 14 (steps 406-410). Again, while not illustrated for clarity, the recommendation for the song may also be provided to the peer devices 12-2 and 12-4 via the proxy function 34 of the central server 14. Likewise, the peer device 12-4 also plays a song and sends a song recommendation to the peer device 12-1 via the proxy function 34 of the central server 14 (steps 412-416). Again, while not illustrated for clarity, the recommendation for the song may also be provided to the peer devices 12-2 and 12-3 via the proxy function 34 of the central server 14.

The recommendation engine 24-1 of the peer device 12-1 may optionally filter the recommendations from the other peer devices 12-2 through 12-4 (step 418). Note that if the proxy function 34 has already filtered the recommendations, no filtering or limited filtering may be desired at the recommendation engine 24-1. Based on user preferences, the recommendation engine 24-1 automatically selects a next song to play from the songs identified by the recommendations received from the other peer devices 12-2 through 12-4, optionally songs identified by previously received recommendations from the peer devices 12-2 through 12-4, and optionally one or more songs from the music collection 26-1 (step 420). In the preferred embodiment discussed below, the songs identified by the recommendations from the other peer devices 12-2 through 12-4 and the songs from the music collection 26-1 are scored based on the user preferences. Then, based on the scores, the recommendation engine 24-1 selects the next song to play.

Once the next song to play is selected, the peer device 12-1 obtains the selected song (step 422). If the selected song is part of the music collection 26-1, the peer device 12-1 obtains the selected song from the music collection 26-1. If the selected song is not part of the music collection 26-1 and the user 20-1 is a subscriber to one or more of the subscription music services 18-1 through 18-M, the recommendation engine 24-1 obtains the selected song from one of the subscription music services 18-1 through 18-M. Note that in one embodiment, the recommendations include the GUIDs of the corresponding songs. In order to determine whether the recommended songs are part of the music collection 26-1 of the user 20-1 of the peer device 12-1, the recommendation engine 24-1 may compare the GUIDs from the recommendations to the GUIDs of the songs in the music collection 26-1 stored in the registry 28-1. Once obtained, the selected song is played (step 424), and a recommendation for the song is provided to the other peer devices 12-2 through 12-4 via the proxy function 34 (steps 426-432).

Returning to step 420, the recommendation engine 24-1 may provide a download queue for downloading songs or previews of songs using a background process such that the songs or previews will be available when desired to be played. If the user 20-1 is a subscriber to one or more of the subscription music services 18-1 through 18-M, songs having a score greater than a first threshold that are not already in the music collection 26-1 are added to the download queue such that the songs are downloaded from one or more of the subscription music services 18-1 through 18-M. Registry entries for the songs may be generated and added to the registry 28-1 before, during, or after download. Songs having a score less than the first threshold but greater than a second threshold may be added to the download queue such that previews of the songs are downloaded from a remote source such as one or more of the subscription music services 18-1 through 18-M.

Figure 7:
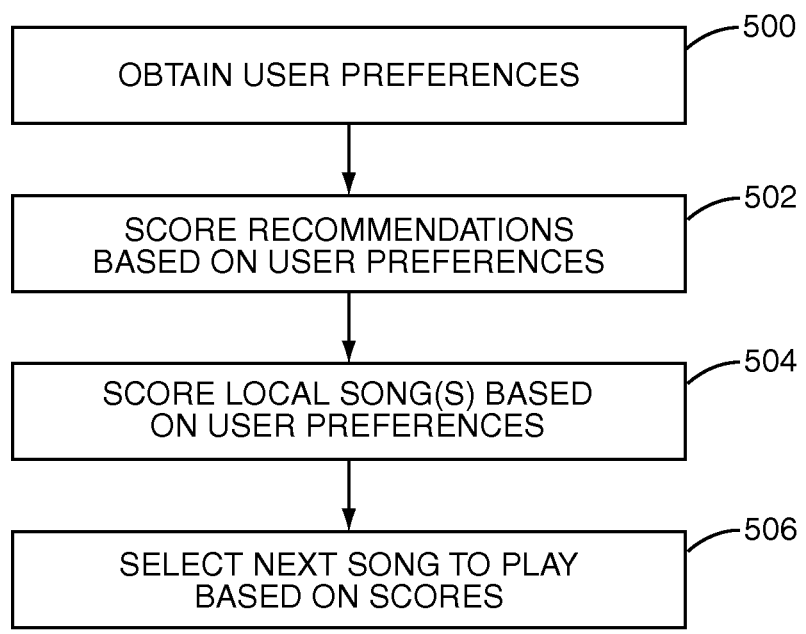
FIG. 7 illustrates the operation of the recommendation engine of a peer device to automatically select a next media presentation to present from a number of media presentations including media presentations identified by recommendations from other peer devices in the P2P recommendation group.

FIG. 7 illustrates the process of automatically selecting a song to play from the received recommendations and locally stored songs at the peer device 12-1 according to one embodiment of the present invention. However, the following discussion is equally applicable to the peer devices 12-2 through 12-N. First, the user preferences for the user 20-1 of the peer device 12-1 are obtained (step 500). The user preferences may include a weight or priority assigned to each of a number of categories such as, but not limited to, user, genre, decade of release, and availability. The user preferences may be obtained from the user 20-1 during an initial configuration of the recommendation engine 24-1. In addition, the user preferences may be updated by the user 20-1 as desired. The user preferences may alternatively be suggested by the recommendation engine 24-1 or the central server 14 based on the play history of the peer device 12-1 and the songs in the music collection 26-1 of the peer device 12-1. The user preferences may be stored locally at the peer device 12-1 or remotely at the central server 14 in the user accounts database 38. If stored remotely, the recommendation engine 24-1 may obtain the user preferences from the central server 14 when desired.

Once recommendations are received from the other peer devices 12-2 through 12-4 (FIG. 5), the recommendation engine 24-1 of the peer device 12-1 scores the songs identified by the recommendations based on the user preferences (step 502). The recommendation engine 24-1 also scores one or more local songs from the music collection 26-1 (step 504). The recommendation engine 24-1 then selects the next song to play based, at least on part, on the scores of the recommended and local songs (step 506).

For more information regarding the real-time recommendations, scoring, and automatic selection process, the interested reader is directed to U.S. patent application Ser. No. 11/484,130, entitled P2P NETWORK FOR PROVIDING REAL TIME MEDIA RECOMMENDATIONS, filed Jul. 11, 2006; U.S. patent application Ser. No. 11/609,945, entitled MAINTAINING A MINIMUM LEVEL OF REAL TIME MEDIA RECOMMENDATIONS IN THE ABSENCE OF ONLINE FRIENDS, filed Dec. 13, 2006; and U.S. patent application Ser. No. 11/609,948, entitled SYSTEM AND METHOD FOR IDENTIFYING MUSIC CONTENT IN A P2P REAL TIME RECOMMENDATION NETWORK, filed Dec. 13, 2006; all of which are hereby incorporated herein by reference their entireties.

Figure 8:
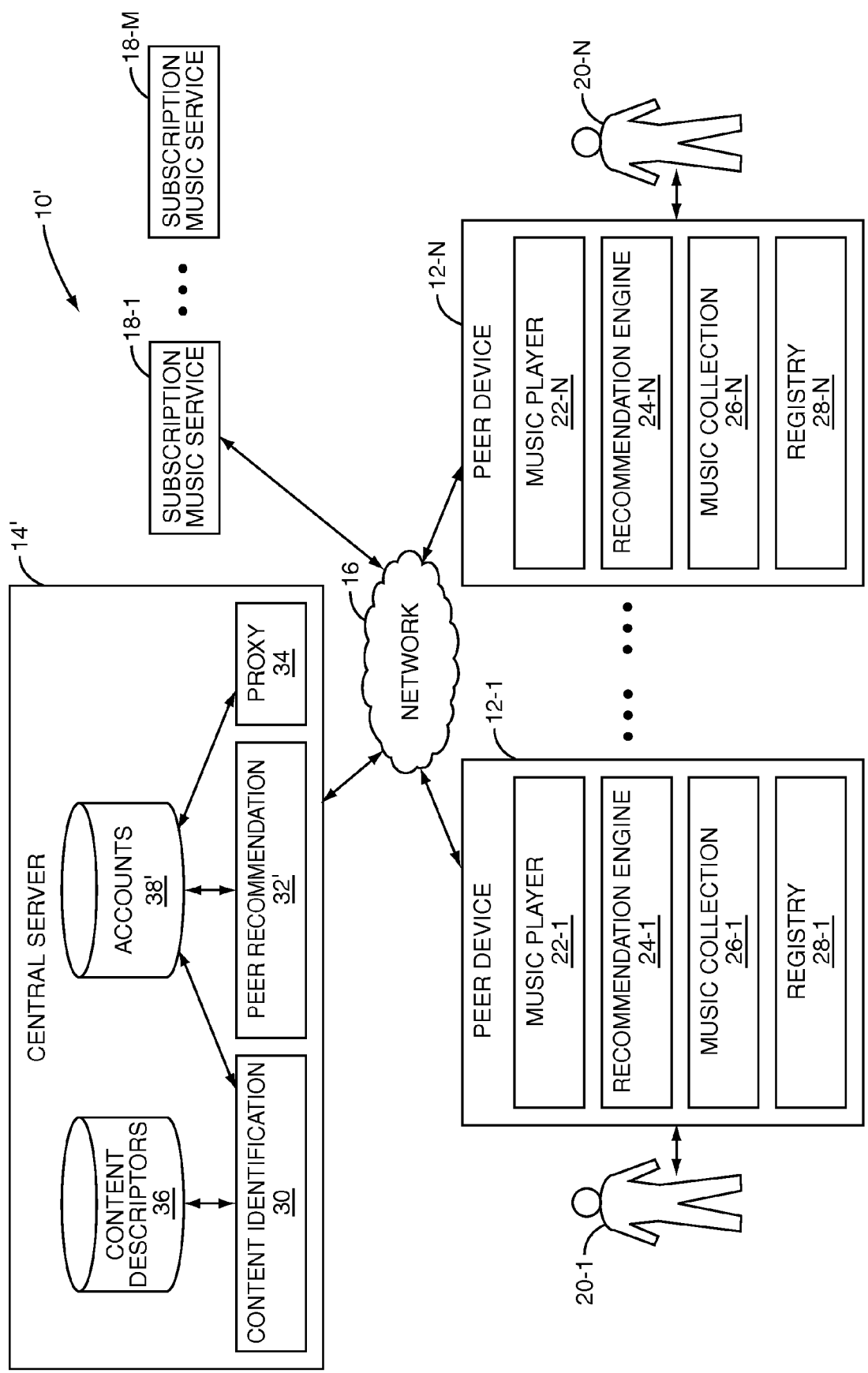
FIG. 8 illustrates the system of FIG. 1 according to another embodiment of the present invention.

FIG. 8 illustrates the system 10' according to another embodiment of the present invention. In general, while the system 10 discussed above is user-centric, the system 10' is device-centric. More specifically, in this embodiment, the central server 14' includes the content identification function 30, a peer recommendation function 32', the proxy function 34, the content descriptors 36, and an accounts database 38'. Using the peer device 12-1 as an example, the peer recommendation function 32' selects others of the peer devices 12-2 through 12-N to add to a P2P recommendation group of the peer device 12-1. The new peer devices for the P2P recommendation group are selected based on whether the peer device 12-1 has access to one or more of the subscription music services 18-1 through 18-M or more specifically based on whether an owner of the peer device 12-1 is a subscriber of one or more of the subscription music services 18-1 through 18-M. The current user 20-1 of the peer device 12-1 may or may not be the owner of the peer device 12-1.

The accounts database 38' stores an account for each of the peer devices 12-1 through 12-N. The accounts may be associated with the peer devices 12-1 through 12-N via identifiers of the peer devices 12-1 through 12-N or identifiers of the owners of the peer devices 12-1 through 12-N. Again, the owners may or may not be the current users 20-1 through 20-N of the peer devices 12-1 through 12-N. Using the peer device 12-1 as an example, the account of the peer device 12-1 includes subscriber status information indicating whether the owner of the peer device 12-1 is a subscriber of one or more of the subscription music services 18-1 through 18-M or a non-subscriber, a list of songs in the music collection 26-1 of the peer device 12-1, and a profile. The account may also include a recommender list for the peer device 12-1 identifying others of the peer devices 12-2 through 12-N in the P2P recommendation group of the peer device 12-1. In addition or alternatively, the recommender list may be stored by the peer device 12-1. The recommender list identifies one or more of the other peer devices 12-2 through 12-N in the P2P recommendation group of the peer device 12-1. The account may also include a play history of the peer device 12-1 and an online status of the peer device 12-1.

The profile of the peer device 12-1 stored in the corresponding account includes statistical information describing the music collection 26-1 such as, for example, a genre distribution, an artist distribution, and a release year distribution. In addition or alternatively, the profile may include statistical information describing the songs in the play history of the peer device 12-1 such as, for example, a genre distribution, an artist distribution, and a release year distribution. In addition, the profile may include information identifying the owner of the peer device 12-1 such as a name, address, e-mail address, and the like and demographic information describing the owner such as age, sex, marital status, and the like.

Note that the list of songs in the music collection 26-1 stored in the account of the peer device 12-1 may be generated by the central server 14' in various manners. In a first embodiment, the songs in the music collection 26-1 are identified by the content identification function 30. In another embodiment, the list of songs in the music collection 26-1 may be generated by monitoring recommendations from the peer device 12-1 provided to others of the peer devices 12-2 through 12-N via the proxy function 34.

Figure 9:
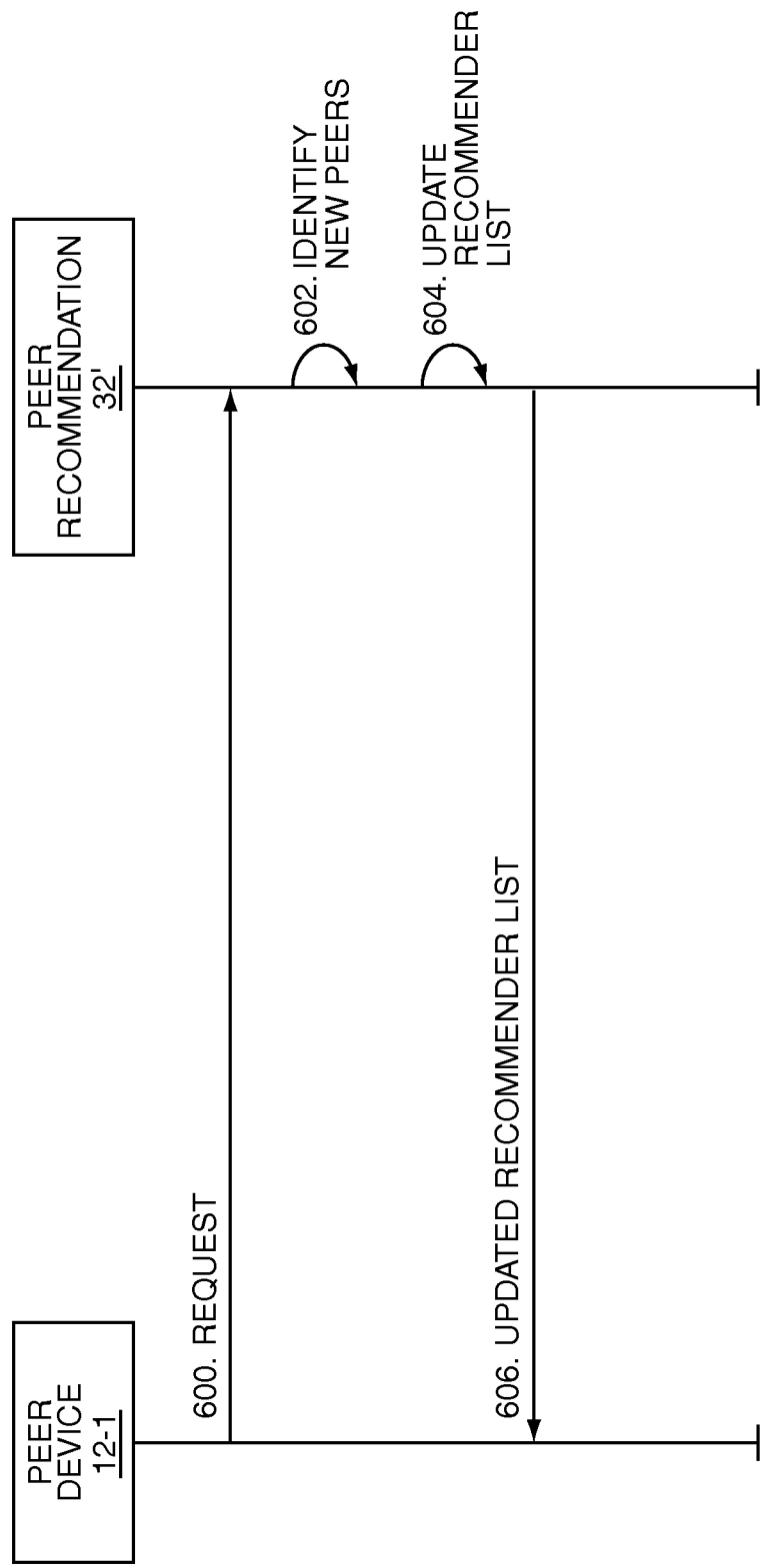
FIG. 9 illustrates the operation of the peer recommendation function of the central server of FIG. 8 according to one embodiment of the present invention.

FIG. 9 illustrates the operation of the peer recommendation function 32' of the central server 14' according to one embodiment of the present invention. Using the peer device 12-1 as an example, the peer device 12-1 first sends a request to the peer recommendation function 32' for new peer devices for the P2P recommendation group of the peer device 12-1 (step 600). The request may be initiated by the user 20-1 when the user 20-1 desires to locate new peer devices for the P2P recommendation group of the peer device 12-1. The P2P recommendation group is defined by, for example, the recommender list of the peer device 12-1. The peer device 12-1 receives recommendations from the other peer devices in the P2P recommendation group of the peer device 12-1 and may further provide recommendations to the other peer devices in the P2P recommendation group of the peer device 12-1. The request may be initiated when the peer device 12-1 currently has no other peer devices in its P2P recommendation group or when the user 20-1 desires to add one or more peer devices to the P2P recommendation group of the peer device 12-1. In addition, the request may indicate the number of new peer devices that the user 20-1 desires to locate.

Upon receiving the request at the central server 14', the peer recommendation function 32' identifies new peer devices for the P2P recommendation group of the peer device 12-1 (step 602). As discussed below, the peer recommendation function 32' selects the new peer devices from the other peer devices 12-2 through 12-N differently depending on whether the owner of the peer device 12-1 is a subscriber of one or more of the subscription music services 18-1 through 18-M or a non-subscriber. Once the new peer devices are selected, the peer recommendation function 32' may update the recommender list of the peer device 12-1 to include the new peer devices (step 604). Note that the peer recommendation function 32' may request approval from the user 20-1 before adding the new peer devices to the recommender list of the peer device 12-1. The peer recommendation function 32' may also provide the updated recommender list to the peer device 12-1 (step 606). By adding the new peer devices to the recommender list of the peer device 12-1 and optionally providing the updated recommender list to the peer device 12-1, the central server 14' effects addition of the new peer devices to the P2P recommendation group of the peer device 12-1.

Figure 10:
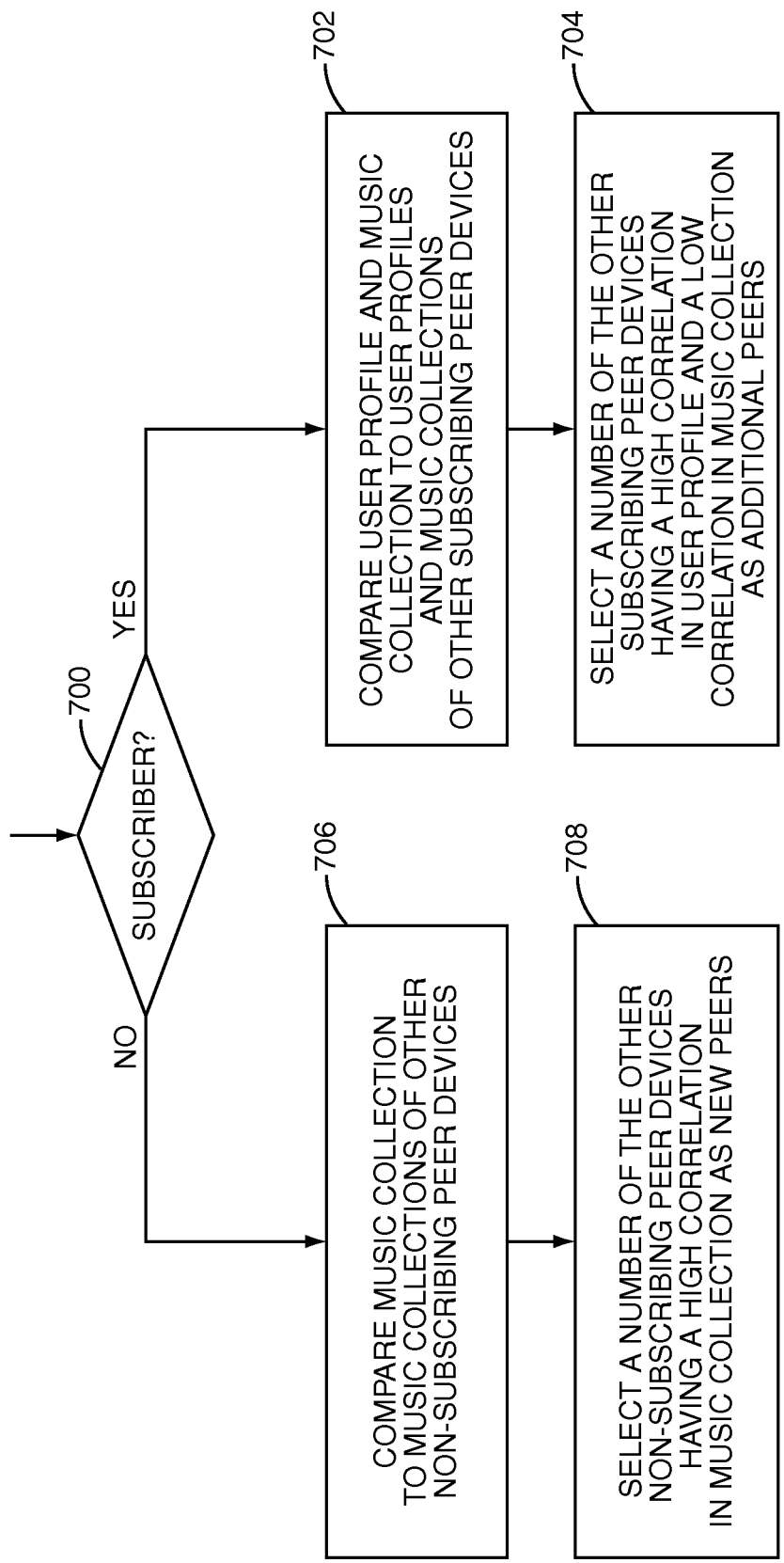
FIG. 10 is a more detailed illustration of the operation of the peer recommendation function of the central server of FIG. 8 according to one embodiment of the present invention.

FIG. 10 is a more detailed illustration of the operation of the peer recommendation function 32' according to one embodiment of the present invention. Again, the peer device 12-1 is used as an example. In response to a request for new peer devices from the peer device 12-1, the peer recommendation function 32' determines whether the owner of the peer device 12-1 is a subscriber of one or more of the subscription music services 18-1 through 18-M or a non-subscriber (step 700). This determination may be made by examining the account of the peer device 12-1. If the owner of the peer device 12-1 is a subscriber (i.e., the peer device 12-1 is a subscribing peer device), the peer recommendation function 32' compares the profile of the peer device 12-1 and the list of songs in the music collection 26-1 stored in the account of peer device 12-1 to the profiles and the list of songs in the music collections of a number of the other peer devices 12-2 through 12-N that are also subscribing peer devices (step 702).

The peer recommendation function 32' then selects a number of the other subscribing peer devices having profiles that have a high correlation to the profile of the peer device 12-1 and music collections that have a low correlation to the music collection 26-1 of the peer device 12-1 as new peer devices for the P2P recommendation group of the peer device 12-1 (step 704). As used herein, in one embodiment, a low correlation between two music collections occurs when the two music collections have less than a static or dynamic threshold number of songs in common. For example, a number of the other subscribing devices with less than X songs in common with the peer device 12-1 may be said to have a low correlation in music collections, where X may be a static threshold or a dynamic threshold selected such that the desired number of new peer devices are selected. In another embodiment, a low correlation between two music collections occurs when less than a static or dynamic threshold percentage of the songs in one of the music collections are also in the other music collection.

In a similar fashion, two profiles have a high correlation when the statistical information in the profiles indicate that the peer devices host the same genres of music, the songs by the same artists, songs from the same time period, or any combination thereof. More specifically, the statistical information may include, for example, a genre distribution, an artist distribution, and a release year distribution. The genre distribution for a peer device may be computed by determining the number of songs in the corresponding music collection in each of a number of genres and dividing the number of songs in each genre by the total number of songs in the music collection in order to normalize the results. In a similar fashion, the artist distribution and the release year distribution may be computed. Two profiles may have a high correlation when one or more of the genre distributions, the artist distributions, and the release year distributions for the two profiles are substantially the same.

Note that when the owner of the peer device 20-1 is a subscriber, it is beneficial to select new peer devices having music collections that have a low correlation to the music collection 26-1 of the peer device 12-1 such that the peer device 12-1 is more likely to receive recommendations for new songs that are not already in the music collection 26-1. Thus, it enables the user 20-1 to experience new songs. Further, by selecting peer devices having profiles that have a high correlation to the profile of the peer device 12-1, the peer recommendation function 32' ensures that the owners or users of the new peer devices have tastes in music similar to the tastes of the owner or user 20-1 of the peer device 12-1.

If the owner 20-1 of the peer device 12-1 is a non-subscriber, the peer recommendation function 32' compares the music collection 26-1 to the music collections of others of the peer devices 12-2 through 12-N that are also non-subscribing peer devices (step 706). More specifically, the peer recommendation function 32' compares the list of songs in the music collection 26-1 stored in the account of the peer device 12-1 to the lists of songs for ones of the peer devices 12-2 through 12-N that are also non-subscribing peer devices. The peer recommendation function 32' then selects a number of the other non-subscribing peer devices having music collections that have a high correlation with the music collection 26-1 of the peer device 12-1 as the new peer devices for the P2P recommendation group of the peer device 12-1 (step 708). As used herein, in one embodiment, a high correlation between two music collections occurs when the two music collections have greater than a static or dynamic threshold number of songs in common or have greater than a static or dynamic percentage of their songs in common. For example, a number of the other non-subscribing peer devices having more than X songs in common with the peer device 12-1 may be said to have a high correlation in music collections, where X may be a static threshold or a dynamic threshold selected such that the desired number of new peer devices are selected.

Note that when the owner of the peer device 12-1 is a non-subscriber, it is beneficial to select new peer devices having music collections that have a high correlation to the music collection 26-1 of the peer device 12-1 such that the peer device 12-1 is more likely to receive recommendations for songs that are already in the music collection 26-1. This is beneficial because the peer device 12-1 is unable to access new songs at the subscription music services 18-1 through 18-M. Also note that the peer recommendation function 32' may also consider other profile information, play history, user preferences, or the like when selecting the new peer devices for the P2P recommendation group of the peer device 12-1.

FIG. 11 is a block diagram of the peer device 12-1 according to one embodiment of the present invention. This discussion is equally applicable to the other peer devices 12-2 through 12-N. In general, the peer device 12-1 includes a control system 40 having associated memory 42. In this example, the music player 22-1 and the recommendation engine 24-1 are at least partially implemented in software and stored in the memory 42. The peer device 12-1 also includes a storage unit 44 operating to store the music collection 26-1 and the registry 28-1 (FIG. 1). The storage unit 44 may be any number of digital storage devices such as, for example, one or more hard-disc drives, one or more memory cards, RAM, one or more external digital storage devices, or the like. The music collection 26-1 and the registry 28-1 may alternatively be stored in the memory 42. The peer device 12-1 also includes a communication interface 46 communicatively coupling the peer device 12-1 to the network 16 (FIG. 1). The peer device 12-1 also includes a user interface 48, which may include components such as a display, speakers, a user input device, and the like.

FIG. 12 is a block diagram of an exemplary embodiment of the central server 14. In general, the central server 14 includes a control system 50 having associated memory 52. In this example, the content identification function 30, the friend recommendation function 32, and the proxy function 34 are at least partially implemented in software and stored in the memory 52. The central server 14 also includes a storage unit 54 operating to store, for example, the content descriptors database 36 and the user accounts database 38 (FIG. 1). The storage unit 54 may be any number of digital storage devices such as, for example, one or more hard-disc drives, one or more memory cards, RAM, one or more external digital storage devices, or the like. The central server 14 also includes a communication interface 56 communicatively coupling the central server 14 to the network 16 (FIG. 1). The central server 14 may also include a user interface 58, which may include components such as a display, speakers, a user input device, and the like.

Figure 13:
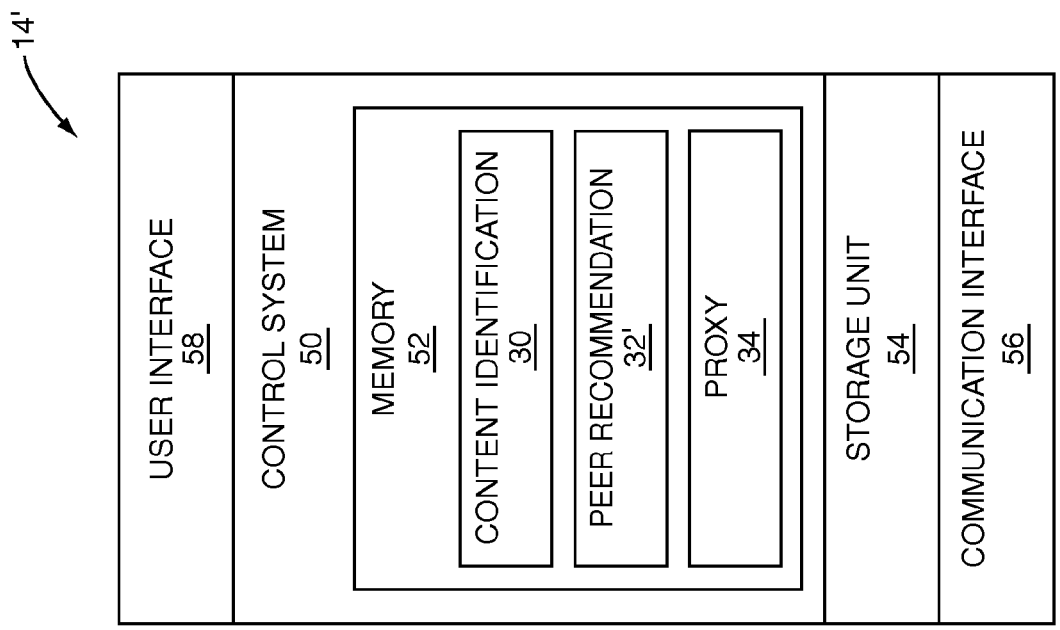
FIG. 13 is a block diagram of the central server of FIG. 8 according to one embodiment of the present invention.

FIG. 13 is a block diagram of an exemplary embodiment of the central server 14'. In general, the central server 14' includes the control system 50 having associated memory 52. In this example, the content identification function 30, the peer recommendation function 32', and the proxy function 34 are at least partially implemented in software and stored in the memory 52. The central server 14' also includes the storage unit 54 operating to store, for example, the content descriptors database 36 and the accounts database 38' (FIG. 8). The storage unit 54 may be any number of digital storage devices such as, for example, one or more hard-disc drives, one or more memory cards, RAM, one or more external digital storage devices, or the like. The central server 14' also includes the communication interface 56 communicatively coupling the central server 14' to the network 16 (FIG. 8). The central server 14' may also include the user interface 58, which may include components such as a display, speakers, a user input device, and the like.

The present invention provides substantial opportunity for variation without departing from the spirit or scope of the present invention. For example, while the discussion herein focuses on song recommendations, the present invention is not limited thereto. The present invention is equally applicable to recommendations for other types of media presentations such as video presentations. Thus, the present invention may additionally or alternatively provide movie recommendations, television program recommendations, or the like. As another example, while the discussion above describes a system where recommendations are provided from, for example, the peer device 12-1 to the other peer devices 12-2 through 12-4 via the proxy function 34, the present invention is not limited thereto. The peer device 12-1 may alternatively provide recommendations to the other peer devices 12-2 through 12-4 via direct P2P connections.

Those skilled in the art will recognize improvements and modifications to the preferred embodiments of the present invention. All such improvements and modifications are considered within the scope of the concepts disclosed herein and the claims that follow.

What is claimed is:

1. A method for matching participants in a Peer-to-Peer (P2P) recommendation network comprising:
  receiving a request from a first peer device of a plurality of peer devices in the P2P recommendation network for a new friend for a P2P recommendation group of a user of the first peer device;
  determining whether the user of the first peer device is a subscriber of at least one of a number of subscription media services;
  if the user of the first peer device is a subscriber of the at least one of the number of subscription media services, selecting the new friend for the user of the first peer device from users of other ones of the plurality of peer devices that are also subscribers of the at least one of the number of subscription media services, wherein selecting the new friend comprises:

comparing a user profile of the user of the first peer device to user profiles of users of the other ones of the plurality of peer devices that are also subscribers of the at least one of the number of subscription media services;

comparing a media collection of the user of the first peer device to media collections of the users of the other ones of the plurality of peer devices that are also subscribers of the at least one of the number of subscription media services; and selecting one of the users of the other ones of the plurality of peer devices having a user profile that has a high correlation to the user profile of the user of the first peer device and a media collection that has a low correlation to the media collection of the user of the first peer device as the new friend for the user of the first peer device; and effecting addition of the new friend to the P2P recommendation group of the user of the first peer device such that media recommendations are provided to the first peer device from one of the plurality of peer devices associated with the new friend.

2. The method of claim 1 wherein the one of the plurality of peer devices associated with the new friend provides the media recommendations to the first peer device as media presentations identified by the media recommendations are played by the one of the plurality of peer devices.

3. The method of claim 1 wherein comparing the media collection of the user of the first peer device to the media collections of the users of the other ones of the plurality of peer devices comprises, for each one of the media collections of the users of the other ones of the plurality of peer devices:

determining a number of media presentations that the one of the media collections and the media collection of the user of the first peer device have in common;

wherein, if the number of media presentations that the one of the media collections and the media collection of the user of the first peer device have in common is less than a threshold number of media presentations, the one of the media collections has a low correlation to the media collection of the user of the first peer device.

4. The method of claim 3 wherein the threshold number of media presentations is a static threshold.

5. The method of claim 3 wherein the threshold number of media presentations is a dynamic threshold.

6. The method of claim 1 wherein comparing the media collection of the user of the first peer device to the media collections of the users of the other ones of the plurality of peer devices comprises, for each one of the media collections of the users of the other ones of the plurality of peer devices:

determining a percentage of media presentations in the media collection of the user of the first peer device that are also in the media collections of the users of the other ones of the plurality of peer devices;

wherein, if the percentage of media presentations is less than a threshold percentage of media presentations, the one of the media collections has a low correlation to the media collection of the user of the first peer device.

7. The method of claim 1 wherein the user profile of the user comprises first statistical information including one or more of a group consisting of: a genre distribution, an artist distribution, and a release year distribution for the media collection of the user of the first peer device, and the user profiles of the other ones of the plurality of devices comprise second statistical information including one or more of a group consisting of: a genre distribution, an artist distribution, and a release year distribution for the media collections of the users of the other ones of the plurality of devices.

8. The method of claim 7 wherein comparing the user profile of the user of the first peer device to the user profiles of the users of the other ones of the plurality of peer devices comprises, for each one of the user profiles of the users of the other ones of the plurality of peer devices:

determining whether the second statistical information from the one of the user profiles is substantially similar to the first statistical information from the user profile of the user of the first peer device;

wherein, if the second statistical information from the one of the user profiles is substantially similar to the first statistical information from the user profile of the user of the first peer device, the one of the user profiles has a high correlation to the user profile of the user of the first peer device.

9. The method of claim 8 wherein determining whether the second statistical information from the one of the user profiles is substantially similar to the first statistical information from the user profile of the user of the first peer device comprises:

generating a score indicative of a similarity of the second statistical information from the one of the user profiles and the first statistical information from the user profile of the user of the first peer device; and comparing the score to a threshold to determine whether the second statistical information from the one of the user profiles is substantially similar to the first statistical information from the user profile of the user of the first peer device.

10. The method of claim 1 further comprising if the user of the first peer device is a non-subscriber of the number of subscription media services, selecting the new friend for the user of the first peer device from users of other ones of the plurality of peer devices that are also non-subscribers of the number of subscription media services.

11. The method of claim 10 wherein if the user of the first peer device is a non-subscriber, selecting the new friend comprises:

comparing a media collection of the user of the first peer device to media collections of the users of the other ones of the plurality of peer devices that are also non-subscribers; and selecting one of the users of the other ones of the plurality of peer devices having a media collection that has a high correlation to the media collection of the user of the first peer device as the new friend for the user of the first peer device.

12. The method of claim 11 wherein comparing the media collection of the user of the first peer device to the media collections of the users of the other ones of the plurality of peer devices comprises, for each one of the media collections of the users of the other ones of the plurality of peer devices:

determining a number of media presentations that the one of the media collections of the users of the other ones of the plurality of peer devices and the media collection of the user of the first peer device have in common;

wherein, if the number of media presentations that the one of the media collections of the users of the other ones of the plurality of peer devices and the media collection of the user of the first peer device have in common is greater than a threshold number of media presentations, the one of the media collections has a high correlation to the media collection of the user of the first peer device.

13. The method of claim 12 wherein the threshold number of media presentations is a static threshold.

14. The method of claim 12 wherein the threshold number of media presentations is a dynamic threshold.

15. The method of claim 11 wherein comparing the media collection of the user of the first peer device to the media collections of the users of the other ones of the plurality of peer devices comprises, for each one of the media collections of the users of the other ones of the plurality of peer devices:
   determining a percentage of media presentations in the media collection of the user of the first peer device that are also in the one of the media collections of the users of the other ones of the plurality of peer devices;
   wherein, if the percentage of media presentations is greater than a threshold percentage of media presentations, the one of the media collections has a high correlation to the media collection of the user of the first peer device.

16. The method of claim 1 wherein effecting addition of the new friend to the P2P recommendation group comprises adding the new friend to a friends list of the user of the first peer device, wherein the friends list defines the P2P recommendation group of the user of the first peer device.

17. The method of claim 1 wherein the number of subscription media services is at least one subscription media service.

18. A central server for matching participants in a Peer-to-Peer (P2P) recommendation network comprising:
   a communication interface adapted to communicatively couple the central server to a plurality of peer devices via a network; and
   a control system associated with the communication interface and adapted to:
      receive a request from a first peer device of the plurality of peer devices for a new friend for a P2P recommendation group of a user of the first peer device;
      in response to the request, determine whether the user of the first peer device is a subscriber of at least one of a number of subscription media services;
      if the user of the first peer device is a subscriber of the at least one of the number of subscription media services, select the new friend for the user of the first peer device from users of other ones of the plurality of peer devices that are also subscribers of at least one of the number of subscription media services wherein in order to select the new friend, the control system is further adapted to:
         compare a user profile of the user of the first peer device to user profiles of users of the other ones of the plurality of peer devices that are also subscribers of at least one of the number of subscription media services;
         compare a media collection of the user of the first peer device to media collections of the users of the other ones of the plurality of peer devices that are also subscribers of at least one of the number of subscription media services; and
         select one of the users of the other ones of the plurality of peer devices having a user profile that has a high correlation to the user profile of the user of the first peer device and a media collection that has a low correlation to the media collection of the user of the first peer device as the new friend for the user of the first peer device; and
      effect addition of the new friend to the P2P recommendation group of the user of the first peer device such that media recommendations are provided to the first peer device from one of the plurality of peer devices associated with the new friend.

19. The central server of claim 18 wherein the one of the plurality of peer devices associated with the new friend provides the media recommendations to the first peer device as media presentations identified by the media recommendations are played by the one of the plurality of peer devices.

20. The central server of claim 18 wherein if the user of the first peer device is a non-subscriber of the number of subscription media services, the control system is further adapted to select the new friend for the user of the first peer device from users of other ones of the plurality of peer devices that are also non-subscribers of the number of subscription media services.

21. A method for matching participants in a Peer-to-Peer (P2P) recommendation network comprising:
   receiving a request from a first peer device of a plurality of peer devices in the P2P recommendation network for a new peer device for a P2P recommendation group of the first peer device;
   determining whether the first peer device is a subscribing peer device having access to at least one of a number of subscription media services;
   if the first peer device is a subscribing peer device having access to the at least one of the number of subscription media services, selecting the new peer device for the P2P recommendation group of the first peer device from other ones of the plurality of peer devices that are also subscribing peer devices, wherein selecting the new peer device comprises:
      comparing a profile of the first peer device to profiles of the other ones of the plurality of peer devices that are also subscribing peer devices;
      comparing a media collection of the first peer device to media collections of the other ones of the plurality of peer devices that are also subscribing peer devices; and
      selecting one of the plurality of peer devices having a profile that has a high correlation to the profile of the first peer device and a media collection that has a low correlation to the media collection of the first peer device as the new peer device; and
   effecting addition of the new peer device to the P2P recommendation group of the first peer device such that media recommendations are provided to the first peer device from the new peer device.

22. The method of claim 21 wherein the new peer device provides the media recommendations to the first peer device as media presentations identified by the media recommendations are played by the new peer device.

23. The method of claim 21 further comprising if the first peer device is a non-subscribing peer device not having access to at least one of the number of subscription media services, selecting the new peer device from other ones of the plurality of peer devices that are also non-subscribing peer devices.

24. A central server for matching participants in a Peer-to-Peer (P2P) recommendation network comprising:
   a communication interface adapted to communicatively couple the central server to a plurality of peer devices via a network; and
   a control system associated with the communication interface and adapted to:
      receive a request from a first peer device of the plurality of peer devices for a new peer device for a P2P recommendation group of the first peer device;
      determine whether the first peer device is a subscribing peer device having access to at least one of a number of subscription media services;
      if the first peer device is a subscribing peer device having access to the at least one of the number of subscription media services, select the new peer device for the P2P recommendation group of the first peer device from other ones of the plurality of peer devices that are also subscribing peer devices, wherein, in order to select the new peer device, the control system is further adapted to:
- compare a profile of the first peer device to profiles of the other ones of the plurality of peer devices that are also subscribing peer devices;
- compare a media collection of the first peer device to media collections of the other ones of the plurality of peer devices that are also subscribing peer devices; and
- select one of the plurality of peer devices having a profile that has a high correlation to the profile of the first peer device and a media collection that has a low correlation to the media collection of the first peer device as the new peer device; and effect addition of the new peer device to the P2P recommendation group of the first peer device such that media recommendations are provided to the first peer device from the new peer device.

25. The central server of claim 24 wherein the new peer device provides the media recommendations to the first peer device as media presentations identified by the media recommendations are played by the new peer device.

26. The central server of claim 24 wherein if the first peer device is a non-subscribing peer device that does not have access to at least one of the number of subscription media services, the control system is further adapted to select the new peer device from other ones of the plurality of peer devices that are also non-subscribing peer devices.

* * * * *